US008971571B1

(12) United States Patent
Starner et al.

(10) Patent No.: US 8,971,571 B1
(45) Date of Patent: Mar. 3, 2015

(54) VISUAL COMPLETION

(75) Inventors: Thad Eugene Starner, Mountain View, CA (US); Irfan Essa, Atlanta, GA (US)

(73) Assignee: Google Inc., Mountain View, CA (US)

( * ) Notice: Subject to any disclaimer, the term of this patent is extended or adjusted under 35 U.S.C. 154(b) by 280 days.

(21) Appl. No.: 13/421,127

(22) Filed: Mar. 15, 2012

Related U.S. Application Data

(63) Continuation of application No. 13/400,181, filed on Feb. 20, 2012, now abandoned.

(60) Provisional application No. 61/584,205, filed on Jan. 6, 2012.

(51) Int. Cl.
*G06K 9/00* (2006.01)

(52) U.S. Cl.
USPC ............ 382/103; 382/107; 382/232; 382/305

(58) Field of Classification Search
CPC ....... G06F 19/321; G06F 3/016; G06F 3/017; G06K 9/00355; G06K 9/00375
USPC .......................... 382/100, 103, 107, 232, 236
See application file for complete search history.

(56) References Cited

U.S. PATENT DOCUMENTS

| 8,489,997 | B2 * | 7/2013 | Abbott et al. | 715/744 |
| 8,515,132 | B2 * | 8/2013 | Shamaie | 382/103 |
| 8,582,821 | B1 * | 11/2013 | Feldman et al. | 382/107 |
| 2006/0288842 | A1 * | 12/2006 | Sitrick et al. | 84/477 R |
| 2008/0059578 | A1 * | 3/2008 | Albertson et al. | 709/204 |
| 2010/0238161 | A1 | 9/2010 | Varga et al. | |
| 2010/0309226 | A1 | 12/2010 | Quack et al. | |
| 2011/0075919 | A1 | 3/2011 | Gokturk et al. | |

OTHER PUBLICATIONS

Oikonomidis et al., "Efficient Model-based 3D Tracking of Hand Articulations using Kinect," The 22nd British Machine Vision Conference (Aug. 2011).
Wang et al., "Real-Time Hand-Tracking with a Color Glove," ACM Transactions on Graphics (Jul. 2009).
Lyons et al., "GART: The Gesture and Activity Recognition Toolkit," HCI (Jul. 2007).
de la Hamette et al., "Laser Triangulation as a means of robust Visual Input for Wearable Computers," International Symposium on Wearable Computers (Oct. 2004).
Athitsos et al., "Estimating 3D Hand Pose from a Cluttered Image," Proceedings of the IEEE Computer Society Conference on Computer Vision and Pattern Recognition (Jun. 2003).

(Continued)

*Primary Examiner* — Ali Bayat
(74) *Attorney, Agent, or Firm* — McDonnell, Boehnen, Hulbert & Berghoff LLP

(57) ABSTRACT

Methods and devices for initiating, updating, and displaying the results of a search of an object-model database are disclosed. In one embodiment, a method is disclosed that includes receiving video data recorded by a camera on a wearable computing device and, based on the video data, detecting a movement corresponding to a selection of an object. The method further includes, before the movement is complete, initiating a search on the object of an object-model database. The method still further includes, during the movement, periodically updating the search and causing the wearable computing device to overlay the object with object-models from the database corresponding to results of the search.

18 Claims, 22 Drawing Sheets

(56) References Cited

OTHER PUBLICATIONS

Stenger et al., "Model-Based 3D Tracking of an Articulated Hand," Proceedings of the IEEE Computer Society Conference on Computer Vision and Pattern Recognition (Dec. 2001).

Freeman et al., "Orientation Histograms for Hand Gesture Recognition," Mitsubishi Electric Research Laboratories (Dec. 1994).

"Histogram of Oriented Gradients," Wikipedia, (Feb. 15, 2012), http://en.wikipedia.org/wiki/Histogram_of_oriented_gradients.

Siwicki, "Moosejaw Mountaineering Gives Catalog Shoppers X-ray Vision," Internet Retailer (Nov. 2011), http://www.internetretailer.com/2011/11/15/moosejaw-mountaineering-gives-catalog-shoppers-x-ray-vision.

Liarokapis et al., "Augmented Reality Techniques for Museum Environments," The Mediterranean Journal of Computers and Networks, vol. 1, No. 2 (Oct. 2005), pp. 90-96.

\* cited by examiner

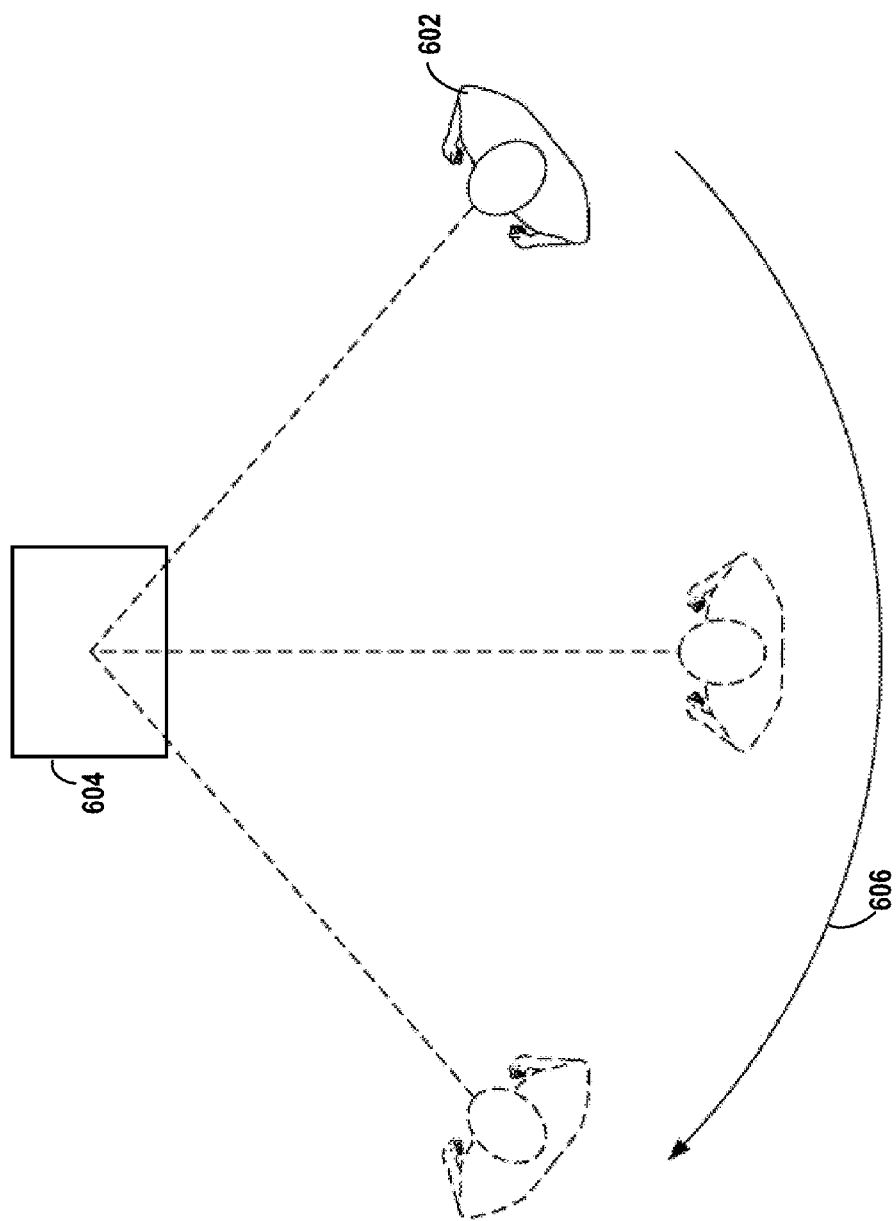

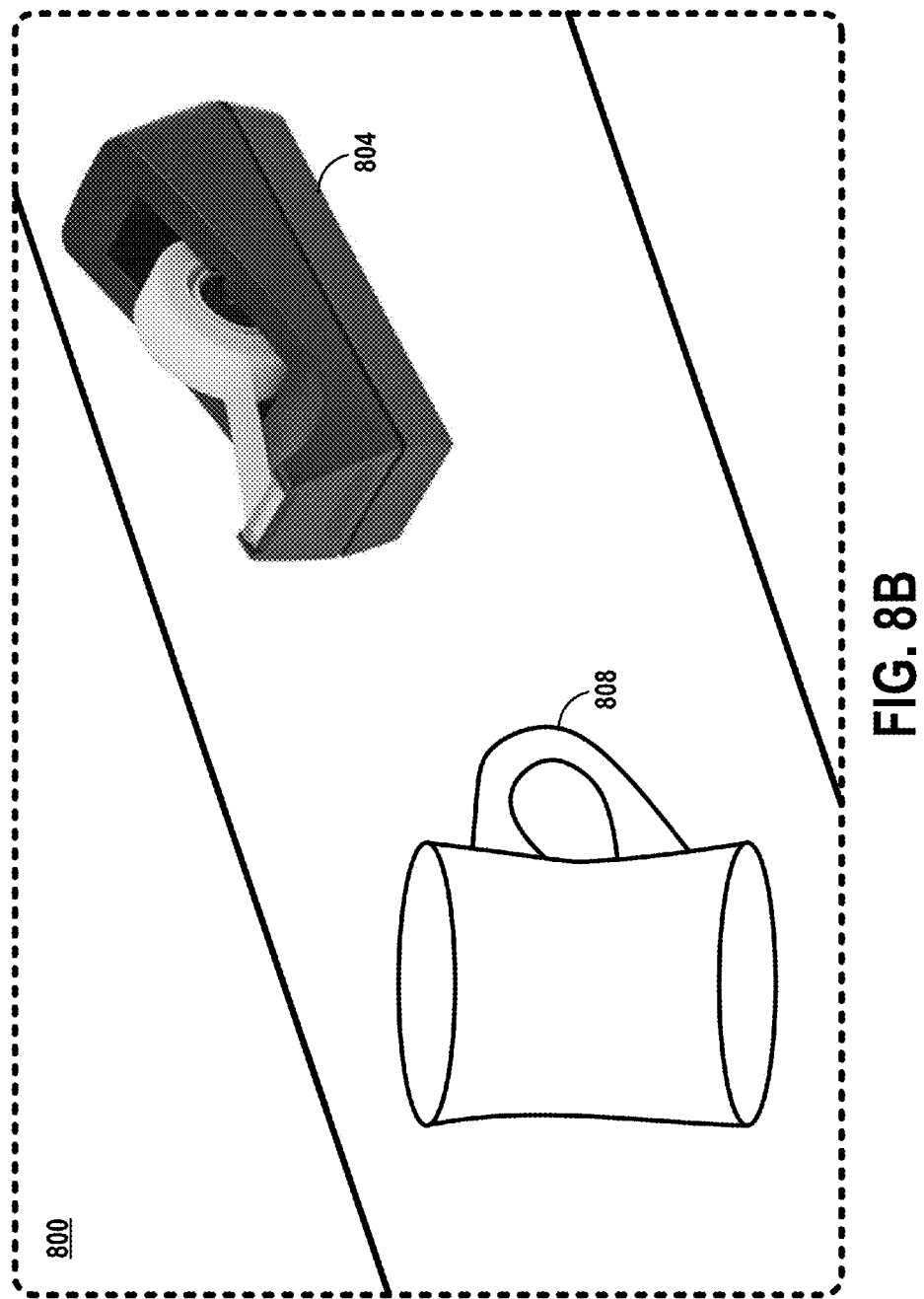

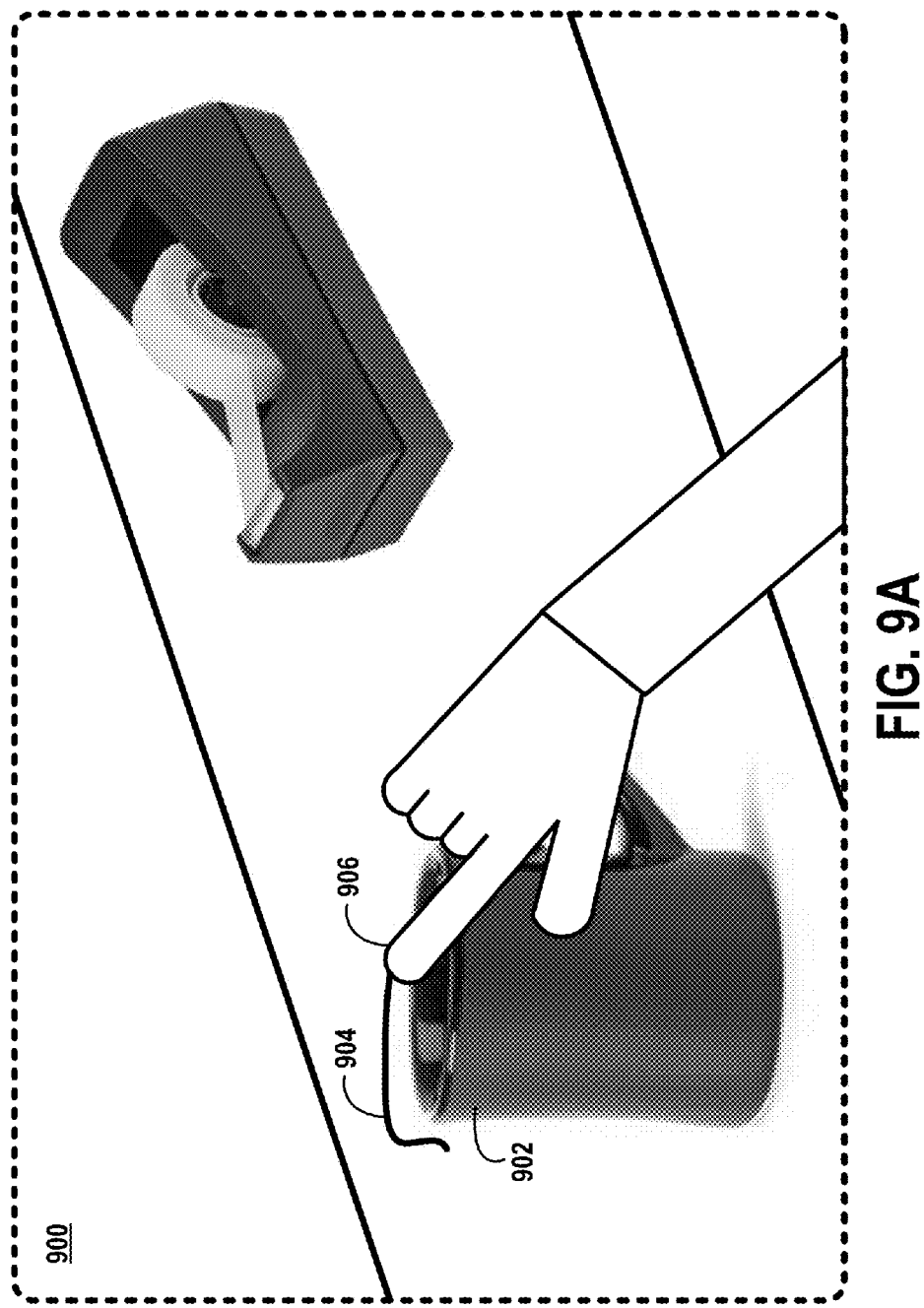

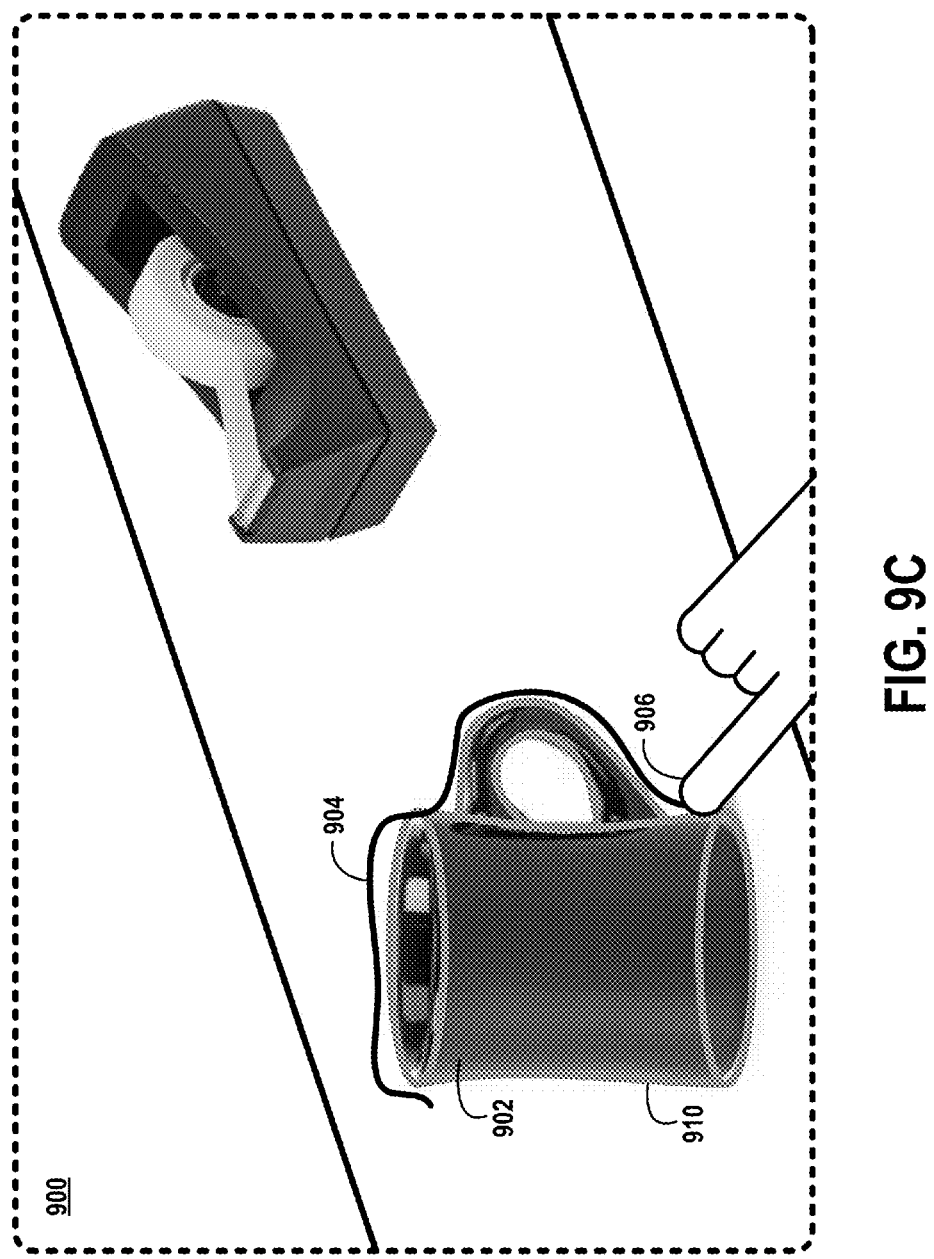

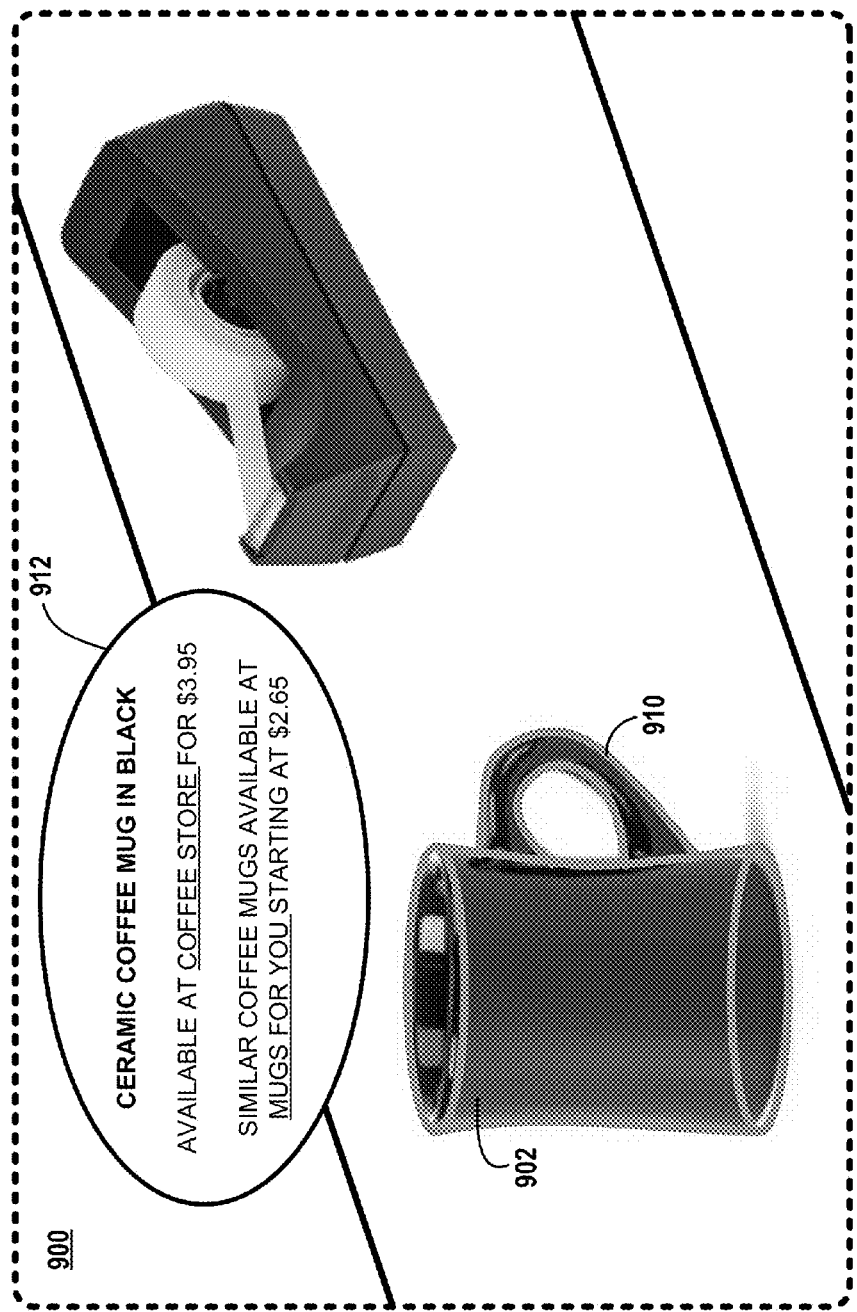

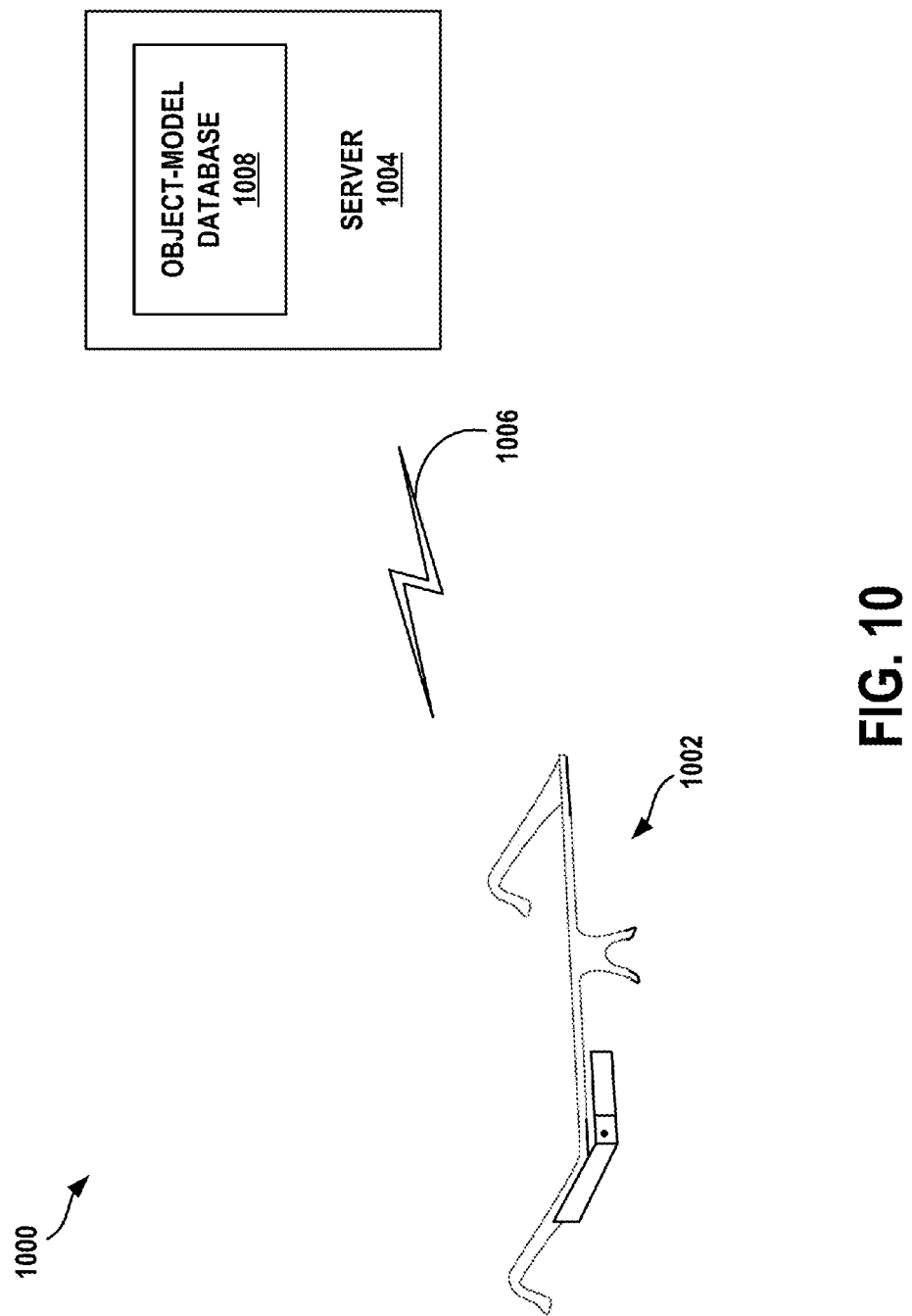

VISUAL COMPLETION

CROSS-REFERENCE TO RELATED APPLICATIONS

This application is a continuation of U.S. patent application Ser. No. 13/400,181 filed Feb. 20, 2012, the contents of which are hereby incorporated by reference, which claims priority to U.S. Provisional Patent Application Ser. No. 61/584,205 filed Jan. 6, 2012, the contents of which are hereby incorporated by reference.

BACKGROUND

Computing devices such as personal computers, laptop computers, tablet computers, cellular phones, and countless types of Internet-capable devices are increasingly prevalent in numerous aspects of modern life. As computers become more advanced, augmented-reality devices, which blend computer-generated information with the user's perception of the physical world, are expected to become more prevalent.

To provide an augmented-reality experience, location and context-aware computing devices may be worn by a user as they go about various aspects of their everyday life. Such computing devices, which are commonly referred to as "wearable" computing devices, are configured to sense and analyze a user's environment and to provide information intelligently, as appropriate to the physical world being experienced by the user.

SUMMARY

In one aspect, an example method is disclosed that includes receiving video data recorded by a camera on a wearable computing device and, based on the video data, detecting a movement corresponding to a selection of an object. The method further includes, before the movement is complete, initiating a search on the object of an object-model database and, during the movement, periodically updating the search and causing the wearable computing device to overlay the object with object-models from the database corresponding to results of the search.

In another aspect, another example method is disclosed that includes using a camera on a wearable computing device to record video data of a movement corresponding to a selection of an object and, before the movement is complete, initiating a search on the object of an object-model database. The method further includes, during the movement, periodically updating the search and causing the wearable computing device to overlay the object with object-models from the database corresponding to results of the search.

In yet another aspect, a non-transitory computer-readable medium is disclosed having stored therein instructions executable by a computing device to cause the computing device to perform one or both of the example methods described above.

In still another aspect, a server is disclosed that includes an interface configured to receive video data recorded by a camera on a wearable computing device, at least one processor, and data storage comprising instructions. The instructions are executable by the at least one processor to detect a movement, based on the video data, corresponding to a selection of an object and, before the movement is complete, to initiate a search on the object of an object-model database. The instructions are further executable by the at least one processor to periodically update the search during the movement and transmit to the wearable computing device object-models from the database corresponding to results of the search on the object.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 6A is an illustration as it may be perceived from above a user of a movement corresponding a selection of an object, in accordance with an embodiment.

FIG. 8B is an image of a scene as it may be perceived by a user of an example wearable computing device while the wearable computing device overlays an object with an opaque object-model, in accordance with an embodiment.

FIG. 9A is an image of a scene as it may be perceived by a user of an example wearable computing device while using a camera on the wearable computing device to record video data of a movement corresponding to a selection of an object, in accordance with an embodiment.

FIG. 9C is an image of a scene as it may be perceived by a user of an example wearable computing device while overlaying an object with a second object-model, in accordance with an embodiment.

FIG. 9D is an image of a scene as it may be perceived by a user of an example wearable computing device while the wearable computing device displays additional information associated with an object, in accordance with an embodiment.

FIG. 10 illustrates an example system in which the disclosed methods may be executed, in accordance with an embodiment.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

1. Overview

A wearable computing device may be configured to record video data. While the wearable computing device is recording the video data, a user may make a movement corresponding to a selection of an object. Once the wearable computing device (or, in some cases, a server in communication with the wearable computing device) detects the movement, the wearable computing device (or the server) may initiate a search on the object of an object-model database. The search may be initiated before the movement is complete, and may be updated during the movement. During the movement, the wearable computing device may overlay the object with object-models from the object-model database. This approach may, for example, allow the user to confirm that the wearable computing device (or the server) has accurately recognized the object. Such a confirmation may improve the accuracy and/or quality of subsequent searches or other actions based on the object.

2. Example Wearable Computing Device Method

Figure 1:
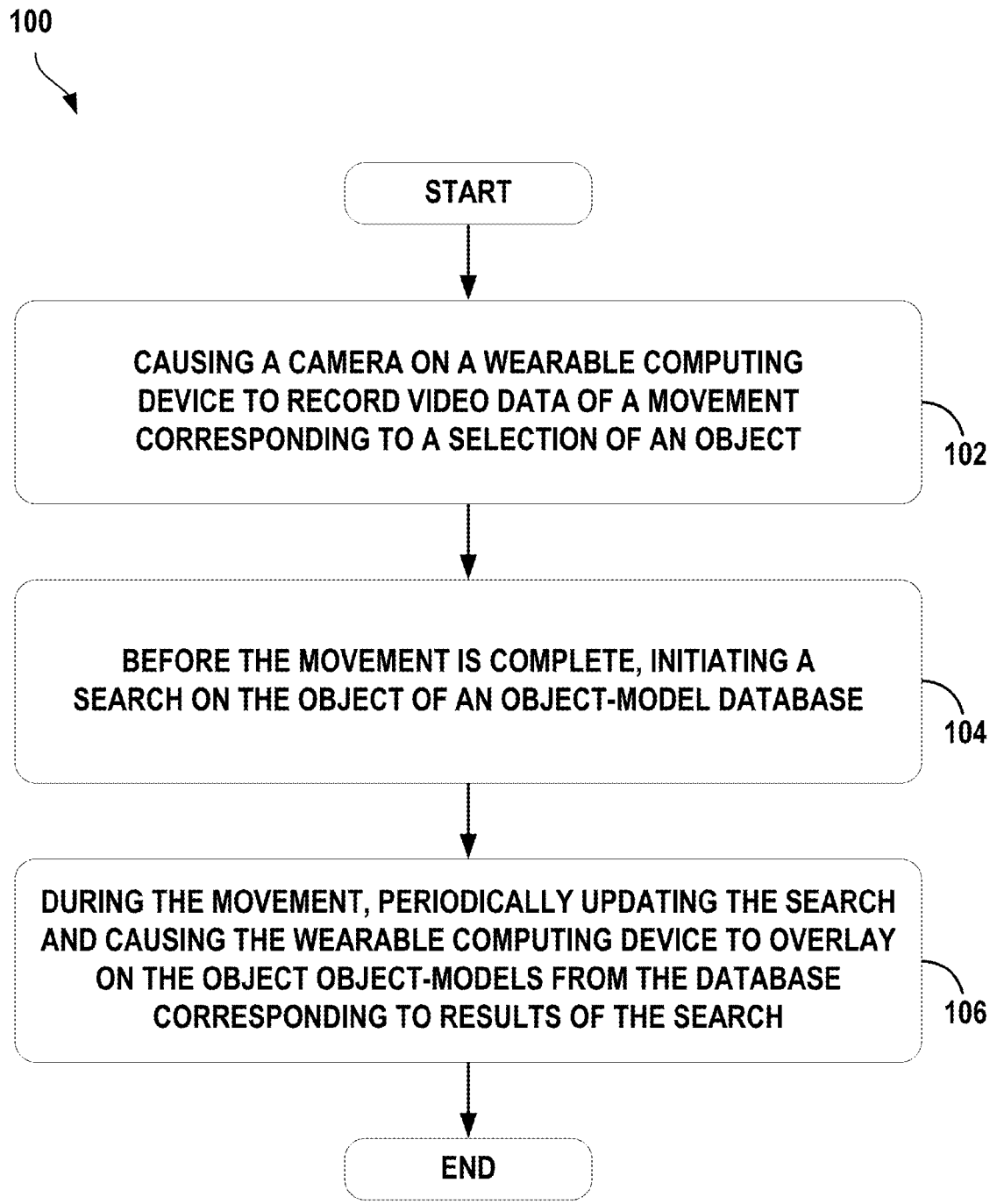
FIG. 1 is a flow chart illustrating an example method to be executed at a wearable computing device, in accordance with an embodiment.

FIG. 1 is a flow chart illustrating an example method 100 to be executed at a wearable computing device, in accordance with an embodiment.

Method 100, shown in FIG. 1, presents an embodiment of a method that, for example, could be used with systems, devices, and servers described herein. Method 100 may include one or more operations, functions, or actions as illustrated by one or more of blocks 102-106. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 100 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include a non-transitory computer-readable medium, for example, such as computer-readable media that store data for short periods of time like register memory, processor cache, and Random Access Memory (RAM). The computer-readable medium may also include non-transitory media, such as secondary or persistent long term storage, like read only memory (ROM), optical or magnetic disks, and compact-disc read only memory (CD-ROM), for example. The computer-readable media may also be any other volatile or non-volatile storage systems. The computer-readable medium may be considered a computer-readable storage medium, a tangible storage device, or other article of manufacture, for example.

In addition, for the method 100 and other processes and methods disclosed herein, each block may represent circuitry that is wired to perform the specific logical functions in the process.

As shown, the method 100 begins at block 102 where the wearable computing device causes a camera to record video data of a movement corresponding to a selection of an object. The movement may be, for example, a movement of a pointing object, such as a body part of a user (e.g., a hand) or a pointing object controlled by a user (e.g., a stylus), or a movement of the object itself. Example movements include a movement defining an outline of the object, a movement that occludes the object, a movement that rotates that object, and a movement that rotates around the object. Other movements are possible as well. The video data may include a single image or may include a plurality of images.

The wearable computing device may detect the movement based on the video data. To this end, the wearable computing device may, for example, monitor the video data for the appearance of the pointing object and/or the object. The pointing object may have a known and/or recognizable shape, texture, color, depth, and/or pattern. For example, in embodiments where the pointing object is a hand of the user, the wearable computing device may monitor the video data for the appearance of an object or item having a color or tone that matches or resembles one or more cataloged colors and/or tones considered to be representative of a variety of skin colors. As another example, in embodiments where the pointing object is a stylus, the wearable computing device may monitor the video data for the appearance of an object or item having a color, pattern, depth, or shape that matches or resembles a known color or pattern of the stylus. For instance, a histogram of oriented gradients (HOG) technique may be used to track the stylus (e.g., as described in "Histogram of Oriented Gradients," Wikipedia, (Feb. 15, 2012), http://en.wikipedia.org/wiki/Histogram_of_oriented_gradients), in which the wearable computing device monitors the video data for the appearance of a histogram (e.g., of intensity gradients and/or edge directions) known to describe the stylus. As still another example, in embodiments where the movement is a movement of the object, the wearable computing device may monitor the video data for characteristic movement of the object, as detected by, for example, analysis of an optical-flow field, as described in, for example, copending U.S. patent application Ser. No. 13/105,828 to Starner. Other techniques may be used as well, including, for example, those described in the following papers and publications: Oikonomidis et al., "Efficient Model-based 3D Tracking of Hand Articulations using Kinect," The 22$^{nd}$ British Machine Vision Conference (August 2011); Wang et al., "Real-Time Hand-Tracking with a Color Glove," ACM Transactions on Graphics (July 2009); Lyons et al., "GART: The Gesture and Activity Recognition Toolkit," HCI (July 2007); de la Hamette et al., "Laser Triangulation as a means of robust Visual input for Wearable Computers," International Symposium on Wearable Computers (October 2004); Athitsos et al., "Estimating 3D Hand Pose from a Cluttered Image," Proceedings of the IEEE Computer Society Conference on Computer Vision and Pattern Recognition (June 2003); Stenger et al., "Model-Based 3D Tracking of an Articulated Hand," Proceedings of the IEEE Computer Society Conference on Computer Vision and Pattern Recognition (December 2001); Freeman et al., "Orientation Histograms for Hand Gesture Recognition," Mitsubishi Electric Research Laboratories (December 1994). It will be appreciated that the movement may be detected from the video data using other techniques as well.

The method 100 continues at block 104 where, before the movement is complete, a search on the object of an object-model database is initiated. To this end, the wearable computing device may, for example, attempt to recognize boundaries of the object based on variations in texture, color, depth, and/or pattern around the object in the video data. Alternatively or additionally, the wearable computing device may select an area of the video data surrounding the object. For instance, in embodiments where the movement is a movement that defines an outline of the object, the wearable computing device may select an area that is bounded on at least one side by the outline. Similarly, in embodiments where the movement is a movement that occludes the object, the wearable computing device may select an area that is progressively more occluded by the movement. Further, in embodiments where the movement is a movement that rotates the object, the wearable computing device may select an area that has a higher optical-flow differential than the remaining video data. Still further, in embodiments where the movement is a movement that rotates around the object, the wearable computing device may select an area that has a lower optical-flow differential than the remaining video data. The wearable computing device may select an area in other manners as well.

Once the wearable computing device has attempted to recognize boundaries of the object, the wearable computing device may search the object-model database on the object. The object-model database includes a plurality of object-models respectively representing a plurality of objects. The wearable computing device may search the object-model database in a number of ways.

In some embodiments, the wearable computing device may search the object-model database by comparing the object (or the area that includes the object) with some or all of the object-models in the database. The wearable computing device may then select an object-model that is most similar to the object (or area). Similarity may be determined based on, for example, a number or configuration of visual features (e.g., colors, shapes, textures, depths, brightness levels, etc.) in the object (or area) and the object-model. For example, an HOG technique may be used to select an object-model, in which each object-model is described by a histogram (e.g., of intensity gradients and/or edge directions), the object (or the area that includes the object) is described by a histogram, and similarity may be determined based on the histograms. Other techniques are possible as well.

In other embodiments, the wearable computing device may search the object-model database by attempting to recognize the object and then searching the object-model database for object-models representing the recognized object. To this end, the wearable computing device may, for example, compare the object (or the area that includes the object) with a database of images (e.g., two-dimensional images) associated with indications of what the images represent (e.g., an image of a red Ikea® Pöang chair may be associated with an indication that the image represents a red Ikea® Pöang chair, etc.) The wearable computing device may then select an image that is most similar to the object (or area). Similarity may be determined based on, for example, a number or configuration of visual features (e.g., colors, shapes, textures, depths, brightness levels, etc.) in the object (or area) and the object-model. The wearable computing device may then, in turn, use the indication associated with the image to select an object-model from the object-model database that represents the object (e.g., an object-model that represents a red Ikea® Pöang chair).

The wearable computing device may search the object-model database in other manners as well. In any case, the object-models may be, for example, three-dimensional models or two-dimensional images. Other object-models are possible as well. The object-model database may be stored on the wearable computing device, or may be stored remotely and accessible to the wearable computing device.

The method 100 continues at block 106 where, during the movement, the wearable computing device periodically updates the search and overlays the object with object-models from the database corresponding to results of the search. For example, once the search is initiated and the wearable computing device selects an object-model from the object-model database, as described above in connection with block 104, the wearable computing device may overlay the object with the selected object-model. That is, the wearable computing device may display the selected object-model so as to appear to the user to be overlaid on the object. In some embodiments, the wearable computing device may additionally display the video data, and may display the selected object-model over a representation of the object in the video data.

As the movement continues, the wearable computing device may re-recognize boundaries of the object and may update the search accordingly. As more of the movement is detected, the wearable computing device may more accurately recognize boundaries of the object and, in turn, more accurately select an object-model from the object-model database. Each time the search is updated, a new object-model may be selected, and the wearable computing device may replace the earlier-selected object-model with the newly-selected object-model to overlay the object. In some embodiments, the wearable computing device may only replace an earlier-selected object-model with newly a selected object-model once the earlier-selected model has been displayed for at least a predetermined amount of time. This approach may avoid overwhelming a user, and, further, may allow the user time to accept the object-model, if desired, as described below.

In order to overlay the object-models on the object, the wearable computing device may, for example, rotate and/or scale the object-models. Object-models may be displayed transparently or semi-transparently, such that the object and the object-model are both visible. Alternatively, object-models may be displayed opaquely, such that the object-model appears to replace the object. In still other cases, only a portion of the object-models may be displayed. The object-models may be displayed in other manners as well.

Thus, during the movement, the user may see a series of one or more object-models overlaid on the object. In some embodiments, when the user sees an object-model that accurately represents the model, the user may accept the object-model through a user-input, such as an input on a touchpad or other user-interface, or an audible input (e.g., the user may speak a command, such as "correct," "complete search," or "OK," or may make another audible input, such as a tongue click or a finger snap). Other user-inputs are possible as well.

In some embodiments, once the user has accepted an object-model, the wearable computing device may determine, generate, or search for additional information associated with the accepted object-model and, in some embodiments, may display the additional information. The additional information may include, for example, an indication of what the object-model represents, as described above, and/or a top result of a search based on the object-model. The server may then cause the wearable computing device to display the additional information.

In other embodiments, the wearable computing device may determine, generate, or search for the additional information at the time of selecting each object-model, and the wearable computing device may display the additional information along with the object-model. Thus, as the user sees each object-model in the series of object-models, as described above, the user may also see the additional information associated with the object-model.

In still other embodiments, the wearable computing device may determine, generate, or search for the additional information at the time of selecting each object-model, but rather than displaying the additional information, the wearable computing device may cache the information. The additional information may then be read from the cache and displayed in response to receiving a user's acceptance of an object-model, as described above.

While the foregoing description focused on the wearable computing device, in some embodiments, one or more of detecting the movement from the video data, searching the object-model database, and selecting object-models may not be performed by the wearable computing device but rather may be performed by a server or other remote entity in communication with the wearable computing device. An example method in which each of these is performed by a server is described in connection with FIG. 2.

3. Example Server Method

Figure 2:
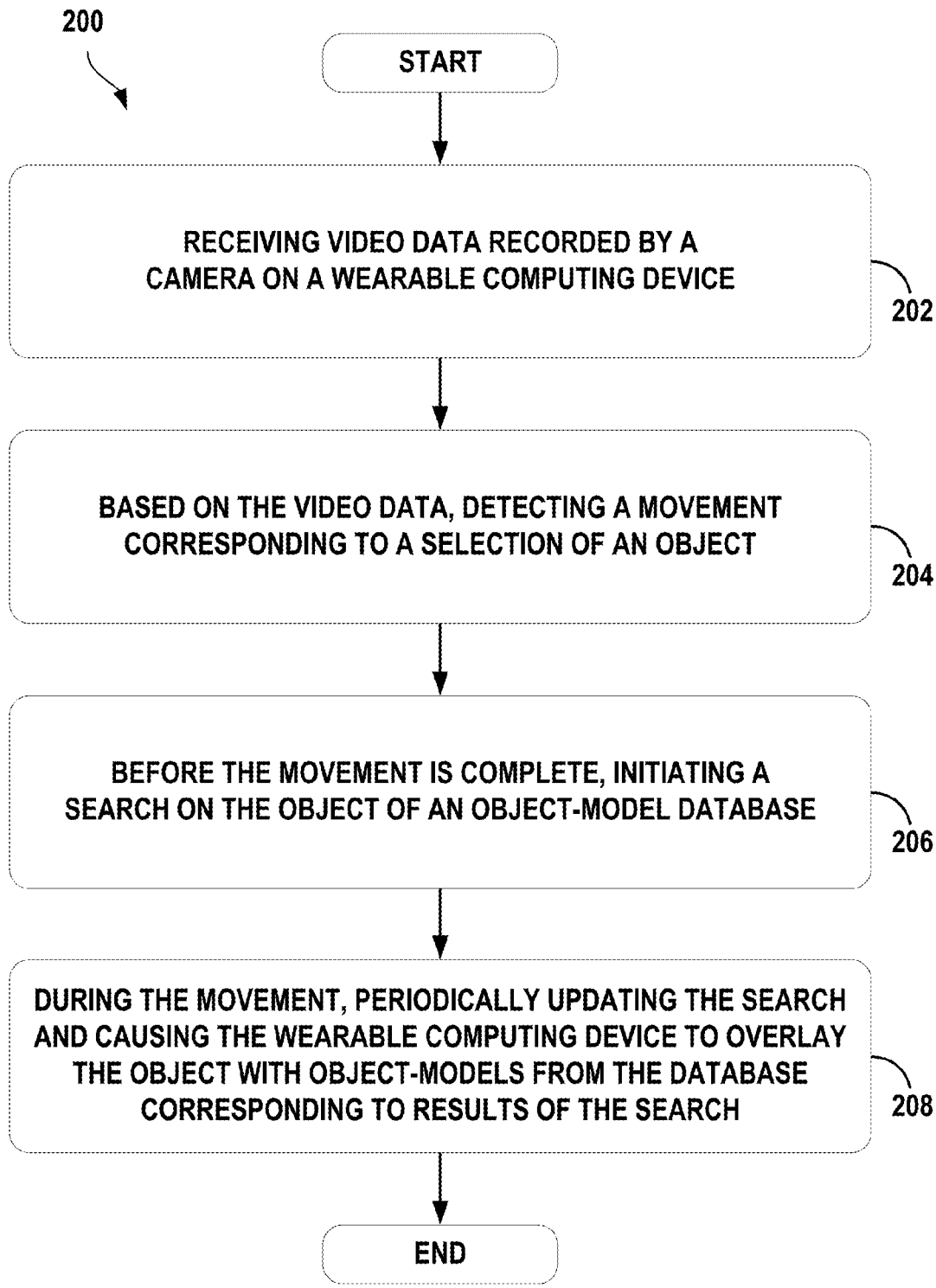
FIG. 2 is a flow chart illustrating an example method to be executed at a server, in accordance with an embodiment.

FIG. 2 is a flow chart illustrating an example method 200 to be executed at a server, in accordance with an embodiment. Method 200 may take any of the forms described above in connection with FIG. 1.

As shown, the method 200 begins at block 202 where a server receives video data recorded by a camera on a wearable computing device. The video data may be raw video data recorded at the camera, or may be video data that is derived from raw video data recorded at the camera.

The method continues at block 204 where, based on the video data, the server detects a movement corresponding to a selection of an object. The movement may be, for example, any of the movements described above. Further, the server may detect the movement based on the video data in any of the manners described above for the wearable computing device.

At block 206, before the movement is complete, the server initiates a search on the object of an object-model database. The server may search the object-model database in any of the manners described above for the wearable computing device. Further, the object-model database may take any of the forms described above. The object-model database may be stored on the server, or may be stored remotely and accessible to the server.

The method 200 continues at block 208 where, during the movement, the server periodically updates the search and causes the wearable computing device to overlay the object with object-models from the database corresponding to results of the search. For example, once the search is initiated and the server selects an object-model from the object-model database, the server may cause the wearable computing device to overlay the object with the selected object-model. That is, the server may send to the wearable computing device instructions to overlay the object with the selected object-model. The wearable computing device may overlay the object with the selected object-model in any of the manners described above. In some embodiments, to aid the wearable computing device in overlaying the object-models on the object, the server may, for example, rotate and/or scale the object-models. Alternatively, the server may transmit the object-models to the wearable computing device without rotating and/or scaling, and the wearable computing device may rotate and/or scale the object-models, as described above.

As the movement continues, the server may re-recognize boundaries of the object and may update the search accordingly. As more of the movement is detected, the server may more accurately recognize boundaries of the object and, in turn, more accurately select an object-model from the object-model database. Each time the search is updated, a new object-model may be selected, and the server may cause the wearable computing device to replace the earlier-selected object-model with the newly-selected object-model to overlay the object. The wearable computing device may replace the earlier-selected model in any of the manners described above.

Thus, during the movement, the user may see a series of one or more object-models overlaid on the object. In some embodiments, when the user sees an object-model that accurately represents the model, the user may accept the object-model through a user-input, as described above.

In some embodiments, once the user has accepted an object-model, the server may receive from the wearable computing device a request for additional information associated with the accepted object-model. The server may responsively determine, generate, or search for additional information associated with the accepted object-model. The additional information may include, for example, an indication of what the object-model represents, as described above, and/or a top result of a search based on the object-model. The server may then cause the wearable computing device to display the additional information.

In other embodiments, the server may determine, generate, or search for the additional information at the time of selecting each object-model, and the server may cause the wearable computing device display the additional information along with the object-model. Thus, as the user sees each object-model in the series of object-models, as described above, the user may also see the additional information associated with the object-model.

In still other embodiments, the server may determine, generate, or search for the additional information at the time of selecting each object-model, but rather than causing the wearable computing device to display the additional information, the server may cause the wearable computing device to cache the information. The additional information may then be read from the cache and displayed in response to receiving a user's acceptance of an object-model, as described above.

As noted above, the steps of detecting the movement from the video data, searching the object-model database, and selecting object-models may be performed by the wearable computing device or the server. In some embodiments, all of these steps may be performed at the wearable computing device, all of these steps may be performed at the server, or one or more of these steps may be performed at the wearable computing device and the remaining step(s) may be performed at the server.

4. Example Movements Corresponding to Selection of an Object

Figure 3:
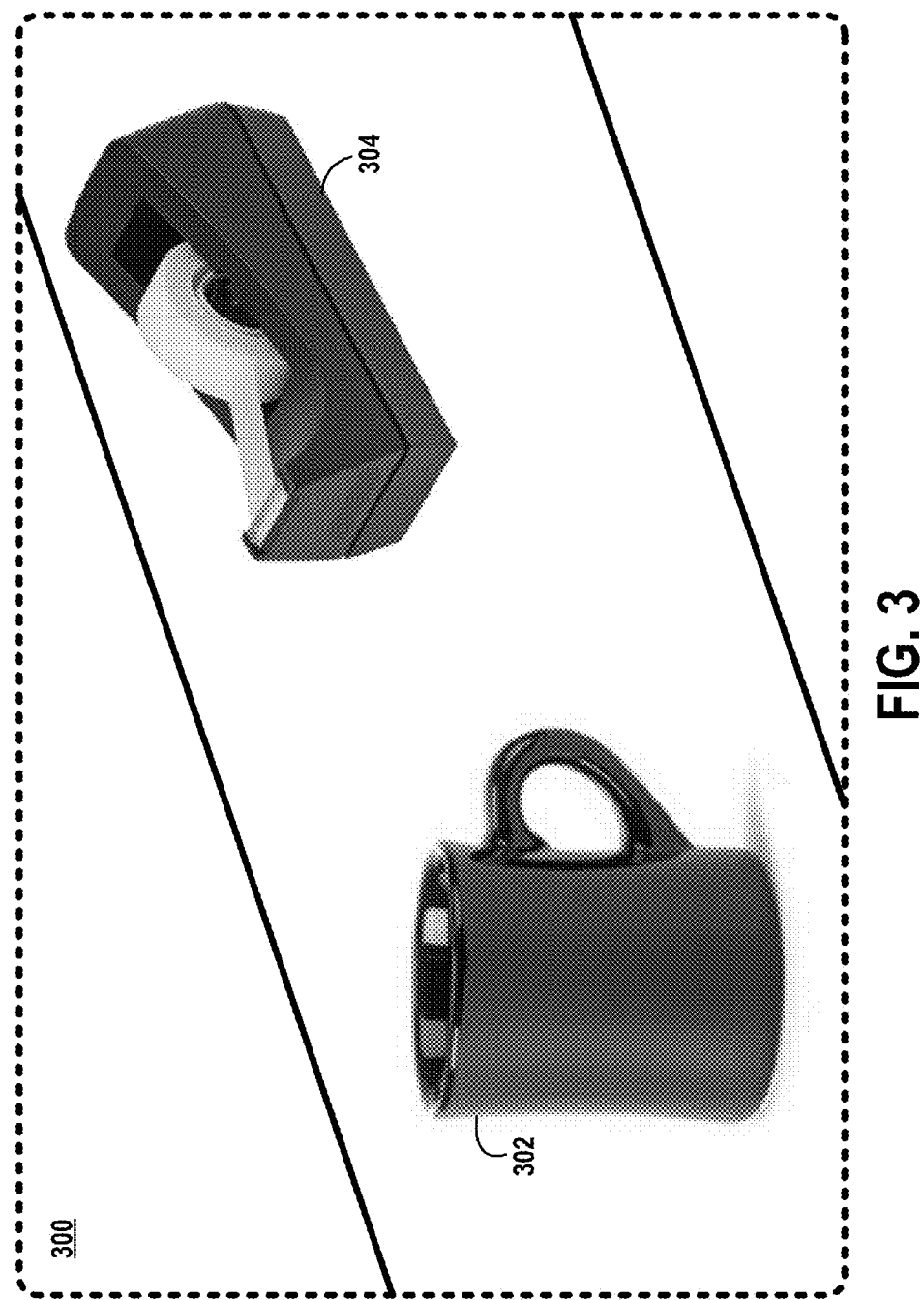
FIG. 3 is an image of a scene as it may be perceived by a user of an example wearable computing device while using a camera on the wearable computing device to record video data, in accordance with an embodiment.

FIG. 3 is an image of a scene 300 as it may be perceived by a user of an example wearable computing device while using a camera on the wearable computing device to record video data, in accordance with an embodiment. As shown, the scene 300 includes a first object 302 and a second object 304.

As noted above, the wearable computing device and/or a server may be configured to detect, based on the video data, a movement corresponding to a selection of an object. For purposes of illustration, a number of example movements are described below in connection with FIGS. 4-7B using example scenes similar to scene 300 and objects similar to objects 302 and 304. It will be appreciated, however, that other scenes, objects, and movements are possible as well.

Figure 4:
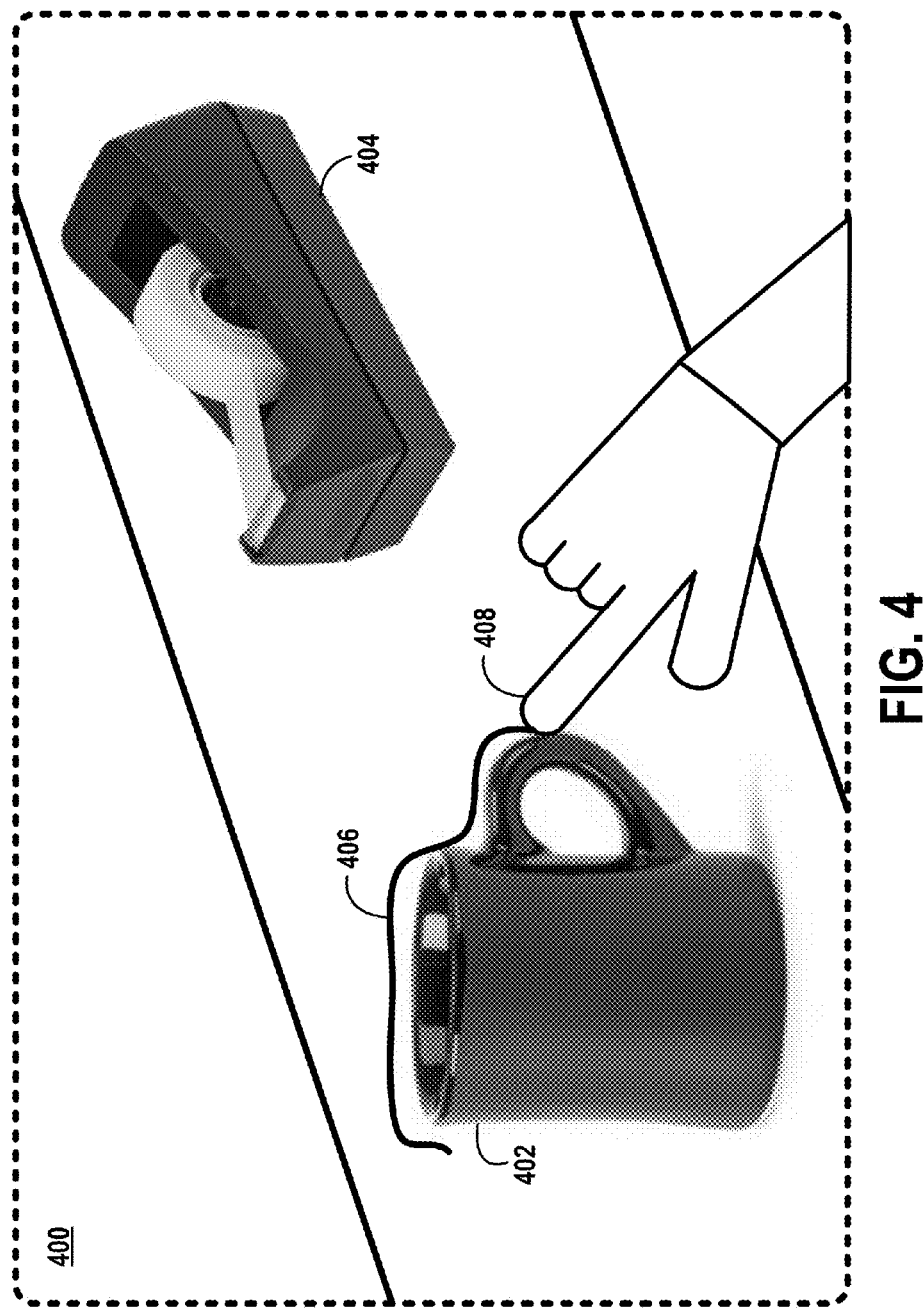
FIG. 4 is an image of a scene as it may be perceived by a user of an example wearable computing device while using a camera on the wearable computing device to record video data of a movement corresponding to a selection of an object, in accordance with an embodiment.

FIG. 4 is an image of a scene 400 as it may be perceived by a user of an example wearable computing device while using a camera on the wearable computing device to record video data of a movement corresponding to a selection of an object, in accordance with an embodiment. As shown, the movement comprises a movement that defines an outline 406 of the first object 402.

The outline 406 may be displayed by the wearable computing device so as to provide feedback to the user while the user performs the movement. While the outline 406 is shown as a solid line, in other embodiments the outline 406 may be indicated in other ways, such as, for example, as a dotted line, a colored line, a lines that appears to "cut" the first object 402 out of the scene 400, or another type of line. In some embodiments, the outline 406 may not be displayed at all.

As shown, the outline 406 is defined by a movement of a pointing object 408. That is, the outline 408 may indicate previous movement of the pointing object 408. While the pointing object 408 is shown as a hand of the user, other pointing objects are possible as well, including, for example, styluses and other pointing objects.

In some embodiments, rather than moving a pointing object 408 to define the outline 406, the outline 406 may instead be defined by, for example, eye movement and/or head movement. The outline 406 may be defined using other movements as well. In any case, the outline 406 around the first object 402 may correspond to a selection of the first object 402.

Figure 5A:
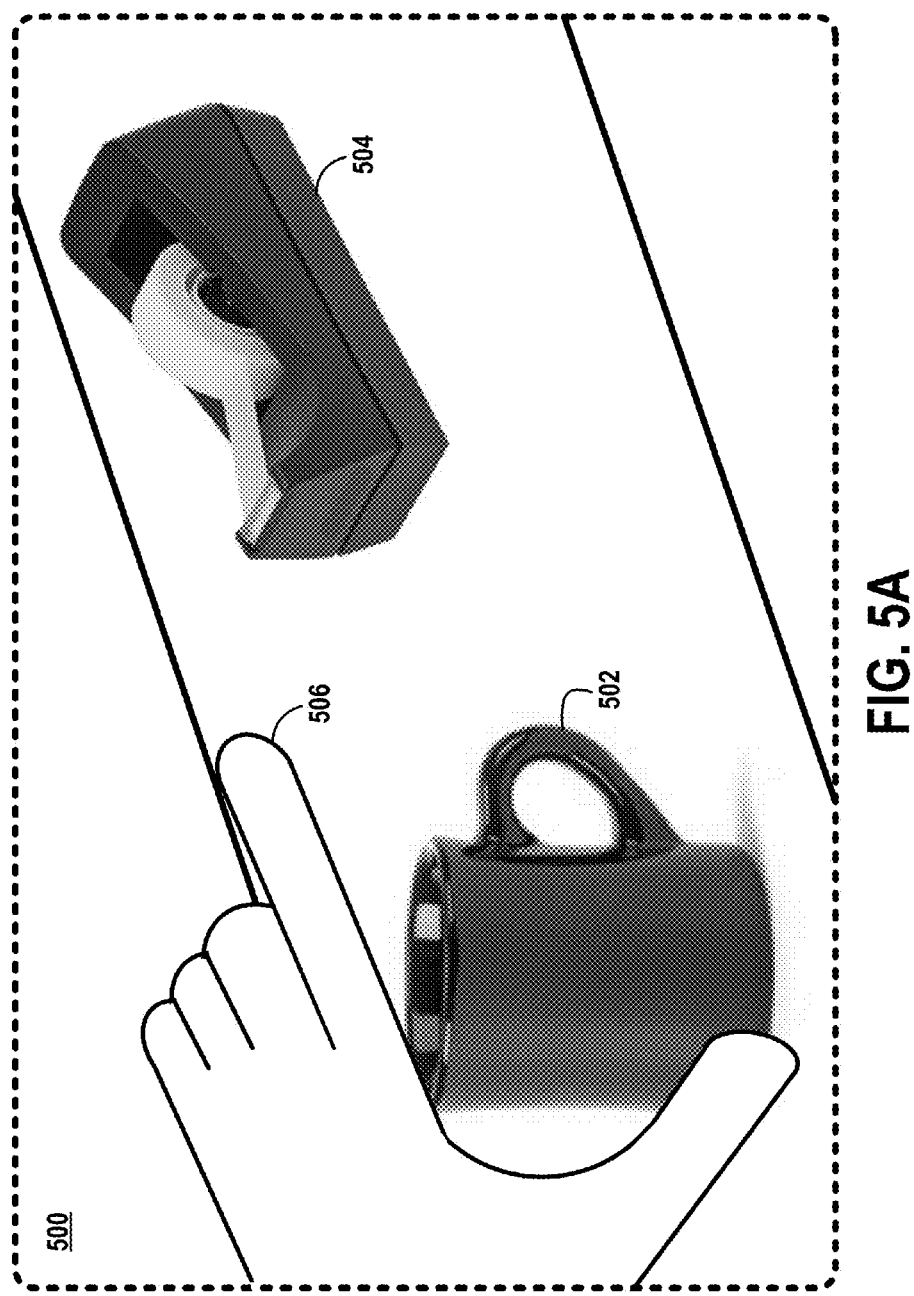
FIGS. 5A-B are images of a scene as it may be perceived by a user of an example wearable computing device while using a camera on the wearable computing device to record video data of a movement corresponding to a selection of an object, in accordance with an embodiment.
Figure 5B:
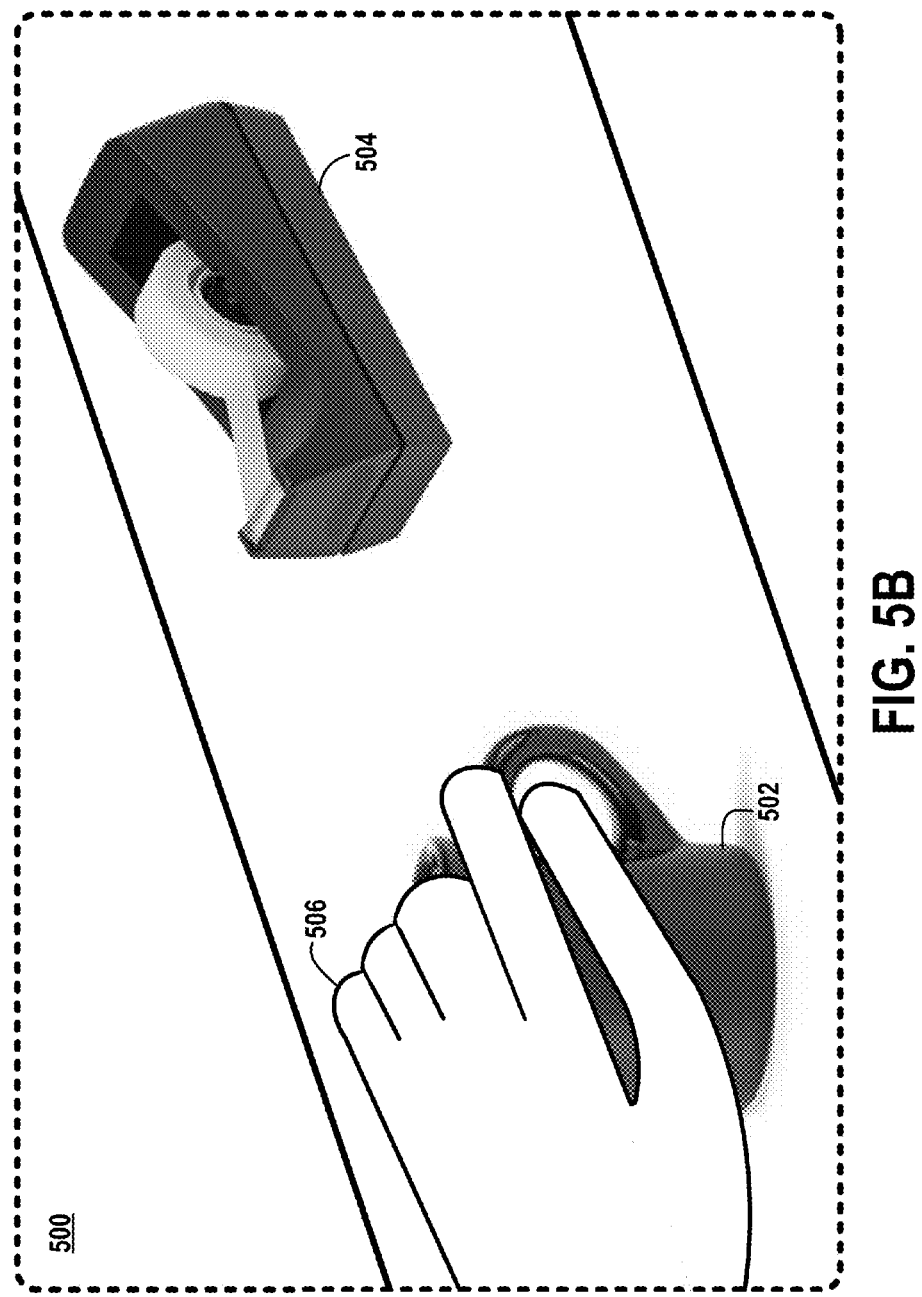

Another example movement is shown in FIGS. 5A-B, which are images of a scene 500 as it may be perceived by a user of an example wearable computing device while using a camera on the wearable computing device to record video data of a movement corresponding to a selection of an object, in accordance with an embodiment. As shown, the movement comprises a movement that occludes the first object 502.

FIG. 5A may illustrate a first frame of video data. As shown in FIG. 5A, the first object 506 is at least partially bounded by a pointing object 506. While the pointing object 506 is shown as a hand of the user, other pointing objects are possible as well, including, for example, styluses and other pointing objects.

FIG. 5B may illustrate a second frame of video data. As shown in FIG. 5B, the first object 502 is at least partially occluded by the pointing object 506. The occlusion of the first object 502 by the pointing object 506 from the first frame to the second frame may correspond to a selection of the first object 402.

FIG. 6A is an illustration as it may be perceived from above a user 602 of a movement 606 corresponding a selection of an object 604, in accordance with an embodiment. The movement 606 may involve the user 602 initially focusing on the object 604. The user 602 may then move along a path around the object 604, keeping the object 604 in substantially the same location within the user's frame of reference during the movement 606. The movement 606 of user 602 around object 604 may be accomplished by the user in various ways. For example, the user 602 may simply walk around the object 604 while keeping the object in the center of their frame of reference. As another example, the user 602 may remain standing in substantially the same place, but move their head in a circular motion around object 604 while keeping the object in the center of their frame of reference. Other examples are possible as well.

The movement 606 may be such that video data captured by a wearable computing device during the movement 606 has a characteristic optical flow. In particular, when the user 602 keeps object 604 in the same position within their frame of reference during the movement 606, the apparent movement of the object 604 (or more particularly, the apparent movement of the pixels in the area where object 604 is located in the video data), will be significantly less than the apparent movement elsewhere in the video data. Therefore, the optical-flow vectors in the area of the object 604 will, on average, have a lesser magnitude than optical-flow vectors elsewhere in the video data, thus creating an optical-flow differential in the area that includes the object 604. Accordingly, the movement 606 may correspond to a selection of the object 604.

Figure 6B:
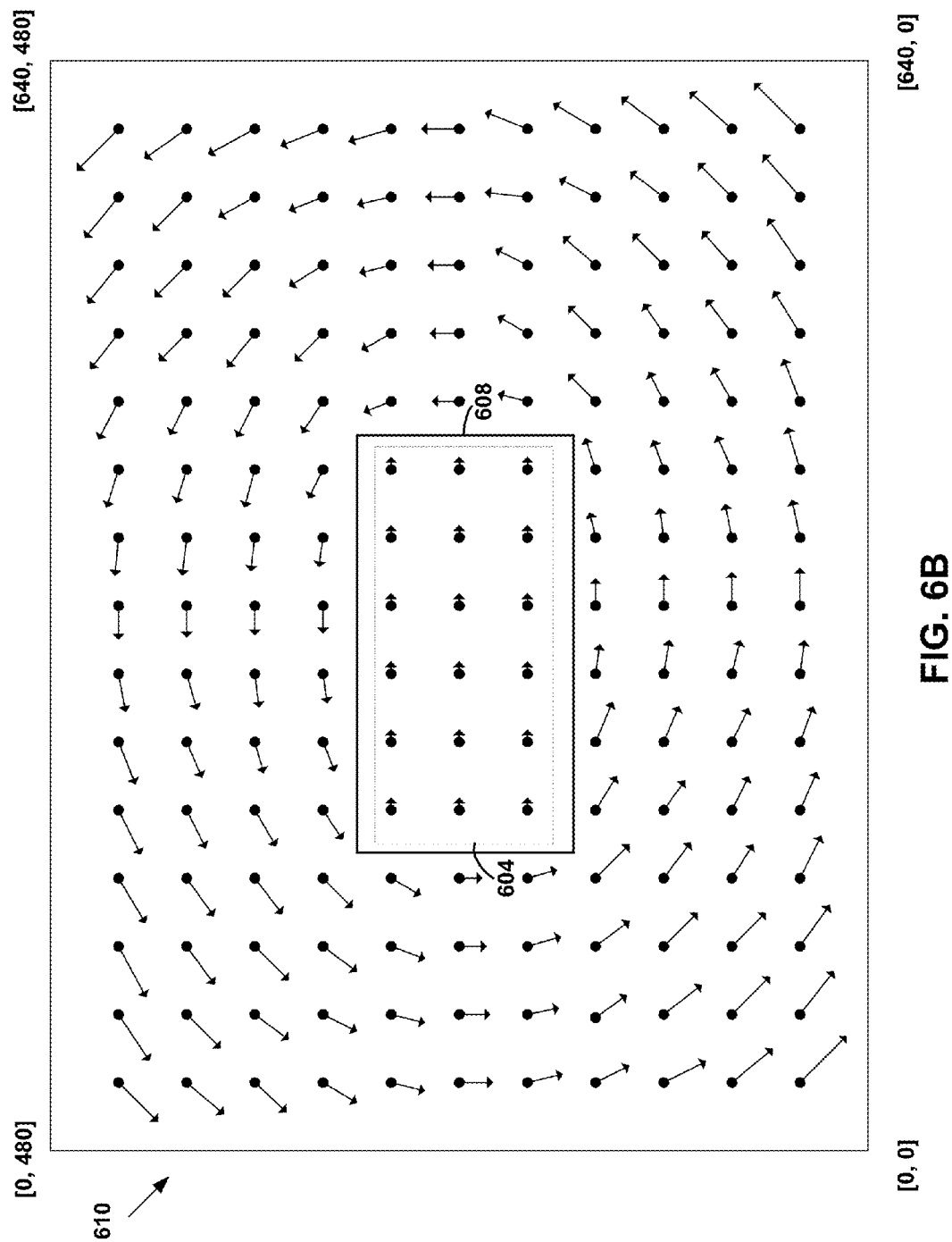
FIG. 6B is an example optical-flow field corresponding to the movement illustrated in FIG. 6A, in accordance with an embodiment.

FIG. 6B is an example optical-flow field 610 corresponding to the movement 606 illustrated in FIG. 6A, in accordance with an embodiment. As shown in FIG. 6B, the optical-flow field 610 includes an area 608 that includes the object 604. The optical-flow vectors within area 608 of are generally of lesser magnitude than the optical-flow vectors outside of area 608. Accordingly, the movement 606 may correspond to a selection of the object 604.

Figure 7A:
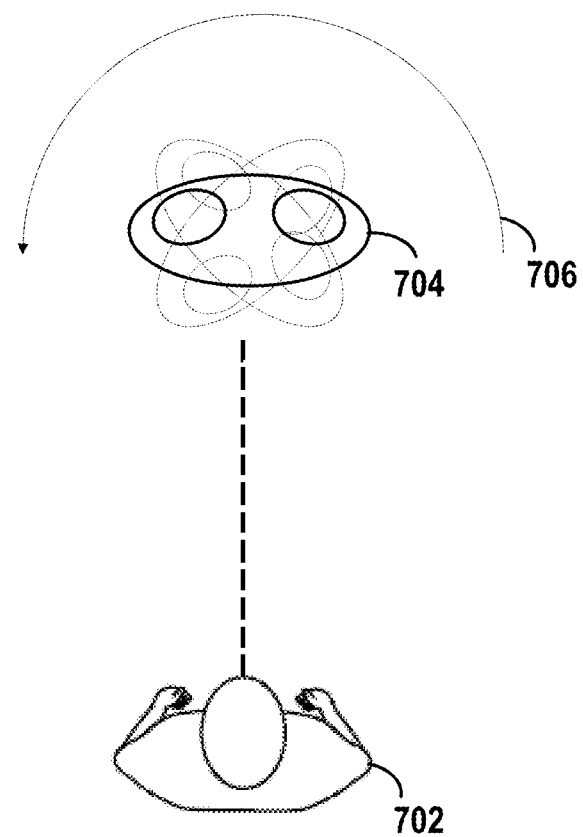
FIG. 7A is an illustration as it may be perceived from above a user of a movement corresponding a selection of an object, in accordance with an embodiment, in accordance with an embodiment.

FIG. 7A is an illustration as it may be perceived from above a user 702 of a movement 706 corresponding a selection of an object 704, in accordance with an embodiment. The movement 706 may involve the user 702 remaining in substantially the same place and substantially fixated on object 704 while the object 704 rotates. The movement 706 may be particularly useful for smaller and/or lightweight objects, which the user 702 can pick up with his or her hands. The user 702 may accordingly initiate a search by holding the object 704 within his or her frame of reference and rotating the object 704 while remaining fixated on it. The movement 706 may also be achieved by simply fixating on the object 704 in embodiments where the object 704 is an object that rotates on its own, such as a carousel for instance. The movement 706 may take other forms as well.

The movement 706 may be such that video data captured by a wearable computing device during the movement 706 has a characteristic optical flow. In particular, when the user 702 remains substantially fixated on the object 704 while the object 704 rotates, the apparent movement of the object 704 (or more particularly, the apparent movement of the pixels in the area where object 704 is located in the video data), will be significantly more than the apparent movement elsewhere in the video data. Therefore, the optical-flow vectors in the area of the object 704 will, on average, have a greater magnitude than optical-flow vectors elsewhere in the video data, thus creating an optical-flow differential in the area that includes the object 704. Accordingly, the movement 706 may correspond to a selection of the object 704.

Figure 7B:
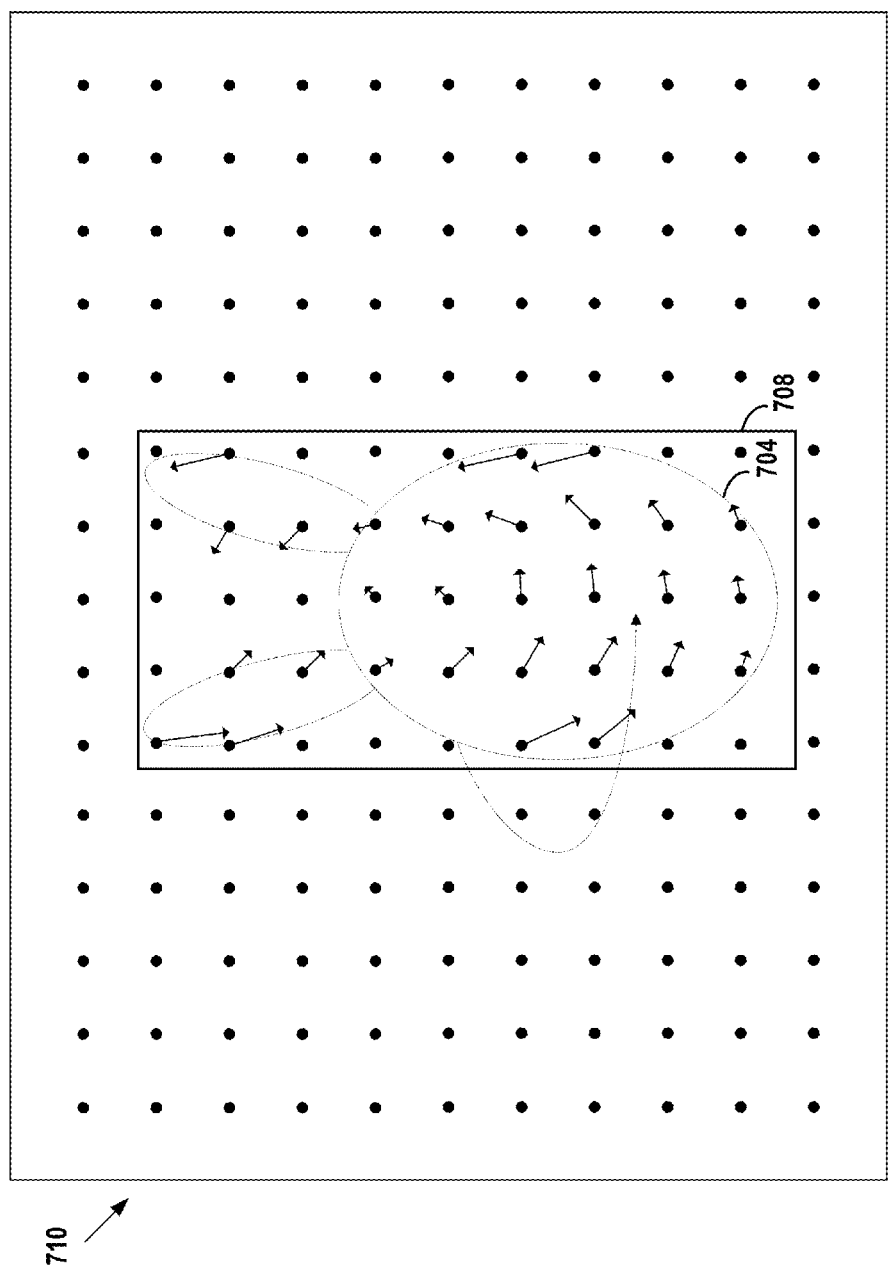
FIG. 7B is an example optical-flow field corresponding to the movement illustrated in FIG. 7A, in accordance with an embodiment.

FIG. 7B is an example optical-flow field corresponding to the movement 706 illustrated in FIG. 7A, in accordance with an embodiment. As shown in FIG. 7B, the optical-flow field 710 includes an area 708 that includes the object 704. The optical-flow vectors within area 708 of are generally of greater magnitude than the optical-flow vectors outside of area 708. Accordingly, the movement 706 may correspond to a selection of the object 704.

While a number of example movements have been described, it will be appreciated that other movements corresponding to selection of an object are possible as well.

5. Example Object-Models

For purposes of illustration, a number of example object-models are described below in connection with FIGS. 8A-D using an example scene 800 that includes object 802 and 804. It will be appreciated, however, that other scenes and objects are possible as well.

Figure 8A:
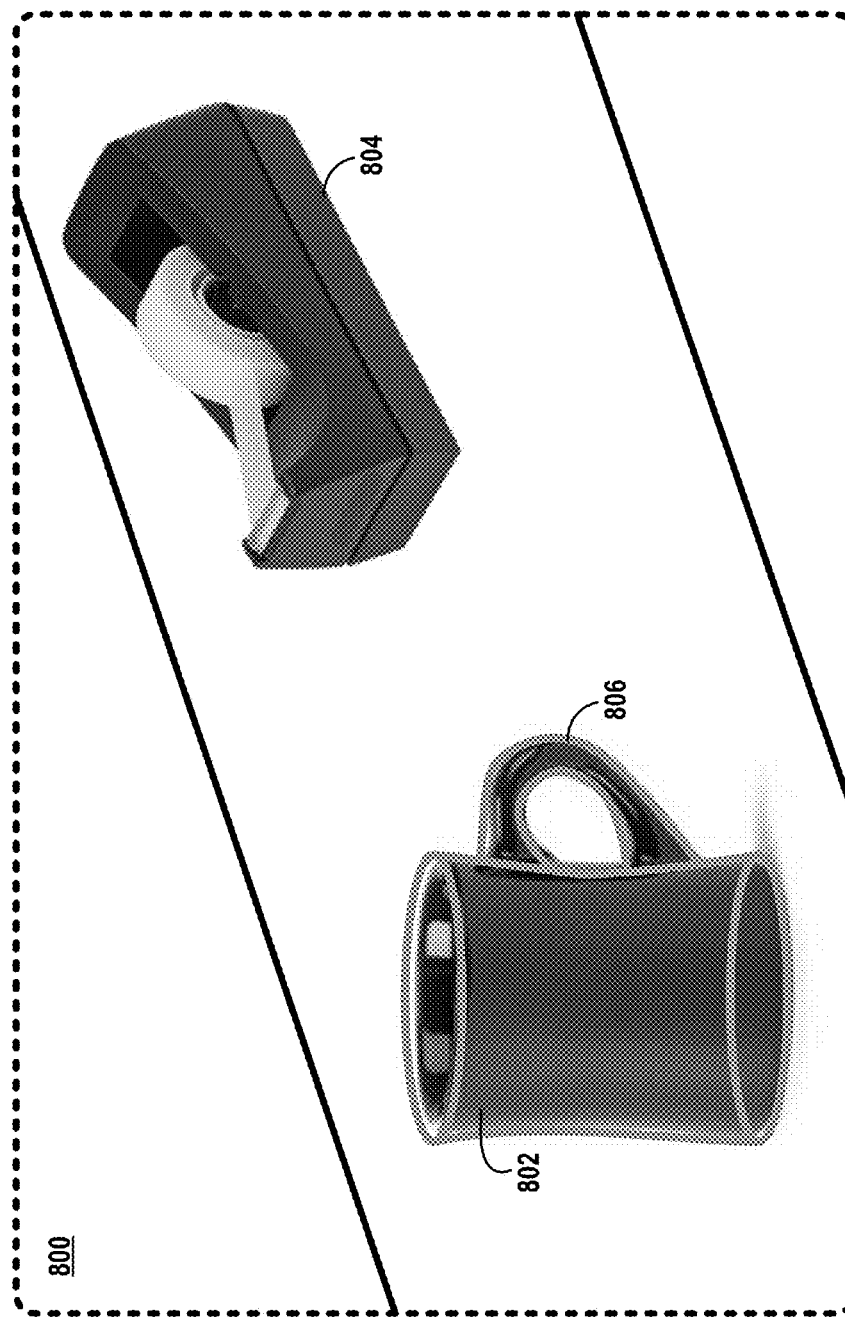
FIG. 8A is an image of a scene as it may be perceived by a user of an example wearable computing device while the wearable computing device overlays an object with a transparent object-model, in accordance with an embodiment.

FIG. 8A is an image of a scene 800 as it may be perceived by a user of an example wearable computing device while the wearable computing device overlays an object 802 with a transparent object-model 806, in accordance with an embodiment. As shown, the object 802 is visible through the transparent object-model 806.

FIG. 8B is an image of a scene 800 as it may be perceived by a user of an example wearable computing device while the wearable computing device overlays an object 802 with an opaque object-model 808, in accordance with an embodiment. As shown, the object 802 is not visible through the opaque object-model 808.

Figure 8C:
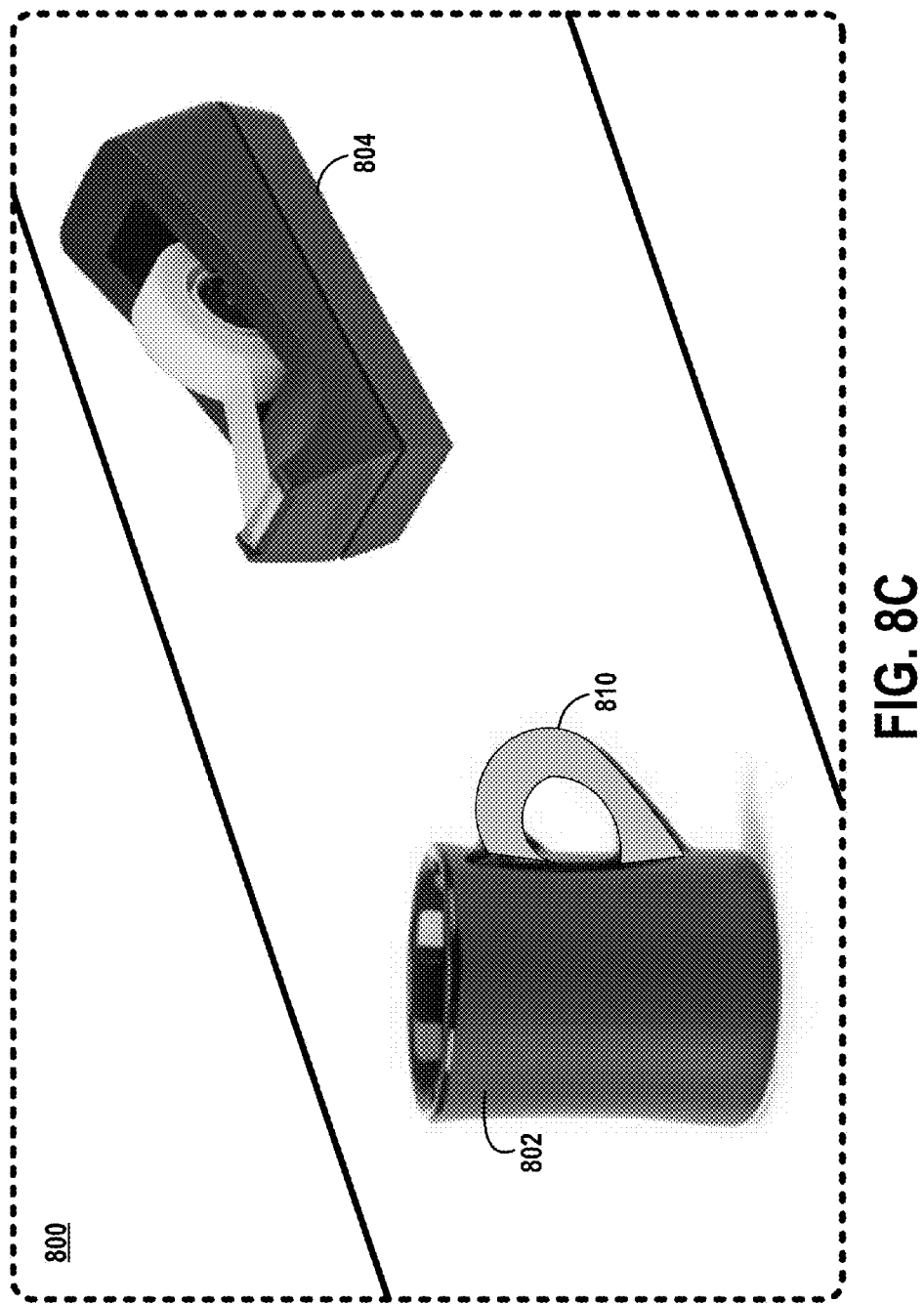
FIG. 8C is an image of a scene as it may be perceived by a user of an example wearable computing device while the wearable computing device overlays a portion of an object with an opaque object-model, in accordance with an embodiment.

FIG. 8C is an image of a scene as it may be perceived by a user of an example wearable computing device while the wearable computing device overlays a portion of an object 802 with an opaque object-model 810, in accordance with an embodiment. As shown, only a portion of the object 802 (e.g., a handle) is overlaid with the object-model 840.

6. Example Embodiment

FIG. 9A is an image of a scene 900 as it may be perceived by a user of an example wearable computing device while using a camera on the wearable computing device to record video data of a movement corresponding to a selection of an object 902, in accordance with an embodiment.

The scene 900 may be a frame from video data recorded by the camera on the wearable computing device. The video data may be raw video data recorded at the camera, or may be video data that is derived from raw video data recorded at the camera.

As described above, a wearable computing device and/or a server may, based on the video data, detect a movement corresponding to a selection of the object 902. As shown, the movement is a movement of a pointing device 908 that defines an outline 906 of the object 902. Other movements are possible as well, including any of those described above.

In response to detecting the movement defining the outline 906 of the object 902, the wearable computing device and/or server may initiate a search on the object 902 of an object-model database. The wearable computing device and/or server may search the object-model database in any of the manners described above. Further, the object-model database may take any of the forms described above.

Figure 9B:
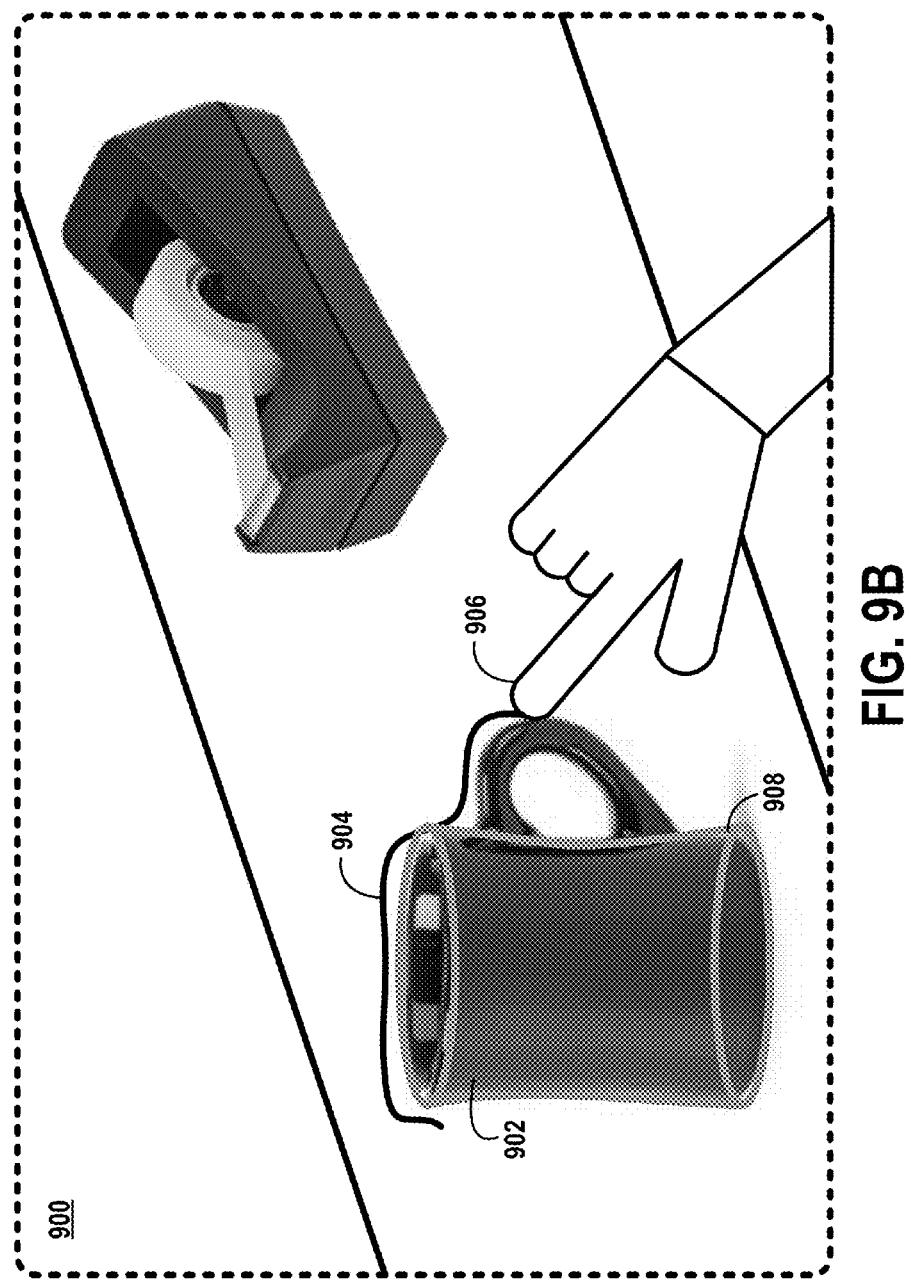
FIG. 9B is an image of a scene as it may be perceived by a user of an example wearable computing device while overlaying an object with a first object-model, in accordance with an embodiment.

Based on the search, the wearable computing device and/or server may select an object-model from the object-model database, as described above. FIG. 9B is an image of the scene 900 as it may be perceived by a user of an example wearable computing device while overlaying the object 902 with a first object-model 908, in accordance with an embodiment. As shown, the first object-model 908 is a transparent object-model. The first object-model 908 may take other forms as well, including any of those described above. In some embodiments, the wearable computing device and/or the server may rotate and/or scale the first object-model 908 in order to overlay the first object-model 908 on the object 902.

As further shown in FIG. 9B, while the first object-model is overlaid on the object 902, the pointing object 906 may continue to define the outline 904. Accordingly, as more of the outline 904 is defined, the wearable computing device and/or the server may update the search of the object-model database. Based on the updated search, the wearable computing device and/or the server may select a second object-model 910. In some cases, as a result of the outline 904 being further defined, the second object-model 910 may more accurately represent the object 902.

FIG. 9C is an image of the scene 900 as it may be perceived by a user of an example wearable computing device while overlaying the object 902 with a second object-model 910, in accordance with an embodiment. As shown, the second object-model 910 is a transparent object-model. The second object-model 910 may take other forms as well, including any of those described above. In some embodiments, the wearable computing device and/or the server may rotate and/or scale the second object-model 910 in order to overlay the second object-model 910 on the object 902.

As shown, the second object-model 910 somewhat accurately represents the object 902. Accordingly, when the object 902 is overlaid with the second object-model 910, the user may accept the second object-model 910 through a user-input, as described above. Once the user has accepted the second object-model 910, the wearable computing device and/or server may determine, generate, or search for additional information associated with the second object-model 910. As the second object-model 910 represents the object 902, the additional information may pertain to the object 902 as well.

FIG. 9D is an image of the scene 900 as it may be perceived by a user of an example wearable computing device while the wearable computing device displays additional information 912 associated with the object 902, in accordance with an embodiment. As shown, the additional information 912 is overlaid on the scene 900. In other embodiments, the additional information 912 may be displayed in other manners as well. For example, the additional information 912 may scroll across the scene 900, may replace the scene 900, or may be displayed on a separate display from the scene 900. In still other embodiments, the additional information 912 may be presented to the user as audio information. The additional information 912 may take other forms as well. Further, while the additional information 912 is shown to include certain information, the additional information may include any information related to the object 902.

7. Example Architecture

Systems and devices in which example embodiments of the above example methods may be implemented will now be described in greater detail. In general, an example system may be implemented in or may take the form of a wearable computing device. However, an example system may also be implemented in or take the form of other devices, such as a mobile phone or tablet computer, among others. Further, an example system may take the form of non-transitory computer-readable medium, which has program instructions stored thereon that are executable by at least one processor to provide the functionality described herein. An example system may also take the form of a device, such as a wearable computing device, mobile phone, or tablet computer, or a subsystem of such a device that includes such a non-transitory computer-readable medium having such program instructions stored thereon.

a. Example System

FIG. 10 illustrates an example system 1000 in which the disclosed methods may be executed, in accordance with an embodiment. As shown, the system 1000 includes a wearable computing device 1002 that is communicably coupled to a server 1004 via a wireless link 1006. While only one wearable computing device 1002 and one server 1004 is shown, more or fewer wearable computing devices and/or servers are possible as well.

As shown, the wearable computing device 1002 is a pair of glasses. In other embodiments, however, other computing devices could additionally or alternatively be used. For example, the wearable computing device 1002 may be an otherwise head-mounted device, such as a visor, headphones, a hat, a headband, an earpiece, or any other type of headwear that is configured to communicably couple to the server 1004. Alternatively or additionally, the wearable computing device 1002 could be an otherwise wearable computing device, such as a backpack, fanny pack, belt, or any other piece of body wear that is configured to communicably coupled to the server 1004. Still alternatively or additionally, the wearable computing device 1002 may be a non-wearable computing device, such as a mobile phone, a tablet computer, or any other device configured to communicably couple to server 1004.

The server 1004 may be, for example, a computer or plurality of computers on which one or more programs and/or applications are executed in order to provide one or more wireless and/or web-based interfaces that are accessible by the wearable computing device 1002 via the wireless link 1006. As shown, the server 1004 includes an object-model database 1008, as described above. In some embodiments, all or a portion of the object-model database may alternatively or additionally be included at the wearable computing device 1002. Further, in some embodiments, all or a portion of the object-model database may alternatively or additionally be included at a remote entity (not shown) that is configured to communicably couple to the wearable computing device 1002 and/or the server 1004.

The wireless link 1006 may use, for example, Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Alternatively or additionally, the wireless link 1006 may be a wired link, such as a wired serial bus (e.g., a universal serial bus or a parallel bus). In either case, the wireless link 1006 may be a proprietary connection.

An example wearable computing device is further described below in connection with FIGS. 11A-D and 12, while an example server is further described below in connection with FIG. 13.

b. Example Wearable Computing Device

Figure 11A:
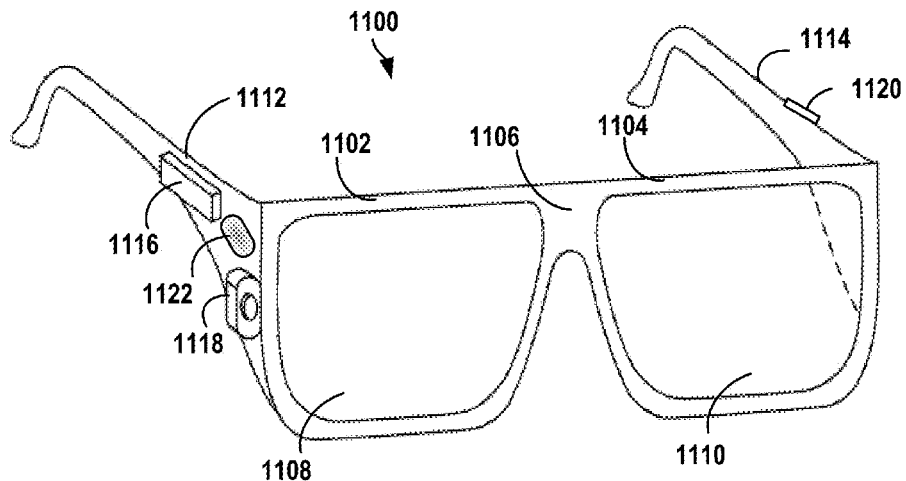
FIGS. 11A-D illustrate three-dimensional renderings of example wearable computing devices, in accordance with an embodiment.

FIGS. 11A-D illustrate three-dimensional renderings of example wearable computing devices, in accordance with an embodiment. As shown in FIG. 11A, the wearable computing system takes the form of a head-mounted device 1100 (which may also be referred to as a head-mounted display). The wearable computing device may take other forms as well, including any of those described above.

As illustrated in FIG. 11A, the head-mounted device 1100 comprises frame elements including lens-frames 1102, 1104 and a center frame support 1106, lens elements 1108, 1110, and extending side-arms 1112, 1114. The center frame support 1106 and the extending side-arms 1112, 1114 are configured to secure the head-mounted device 1100 to a user's face via a user's nose and ears, respectively.

Each of the frame elements 1102, 1104, and 1106 and the extending side-arms 1112, 1114 may be formed of a solid structure of plastic and/or metal, or may be formed of a hollow structure of similar material so as to allow wiring and component interconnects to be internally routed through the head-mounted device 1100. Other materials may be possible as well.

One or more of each of the lens elements 1108, 1110 may be formed of any material that can suitably display a projected image or graphic. Each of the lens elements 1108, 1110 may also be sufficiently transparent to allow a user to see through the lens element. Combining these two features of the lens elements 1108, 1110 may facilitate an augmented reality or heads-up display where a projected image or graphic is superimposed over a real-world view as perceived by the user through the lens elements. For example, combining these two features of the lens elements 1108, 1110 may allow the head-mounted device 1110 to overlay an object-model on an object, as described above.

The extending side-arms 1112, 1114 may each be projections that extend away from the lens-frames 1108, 1110, respectively, and may be positioned behind a user's ears to secure the head-mounted device 1100 to the user. The extending side-arms 1112, 1114 may further secure the head-mounted device 1100 to the user by extending around a rear portion of the user's head (not shown). Additionally or alternatively, for example, the head-mounted device 1100 may connect to or be affixed within a head-mounted helmet structure (not shown). Other possibilities exist as well.

The head-mounted device 1100 may also include an on-board computing system 1116, a video camera 1118, a sensor 1120, and a finger-operable touch pad 1122. The on-board computing system 1116 is shown to be positioned on the extending side-arm 1112 of the head-mounted device 1100; however, the on-board computing system 1116 may be provided on other parts of the head-mounted device 100 or may be positioned remote from the head-mounted device 1100 (e.g., the on-board computing system 1116 could be wire- or wirelessly-connected to the head-mounted device 1100). The on-board computing system 1116 may include a processor and memory, for example. The on-board computing system 1116 may be configured to receive and analyze data from the video camera 1118 and the finger-operable touch pad 1122 (and possibly from other sensory devices, user interfaces, or both) and generate images for output by the lens elements 1108 and 1110.

The video camera 1118 is shown positioned on the extending side-arm 1112 of the head-mounted device 1100; however, the video camera 1118 may be provided on other parts of the head-mounted device 1100. The video camera 1118 may be configured to capture images at various resolutions or at different frame rates. A number of types of video cameras with a small form-factor, such as those used in cell phones or webcams, for example, may be incorporated into an example of the head-mounted device 1100.

Further, although FIG. 11A illustrates one video camera 1118, more video cameras may be used, and each may be configured to capture the same view, or to capture different views. For example, the video camera 1118 may be forward facing to capture at least a portion of the real-world view perceived by the user. This forward facing image captured by the video camera 1118 may then be used to generate an augmented reality in which computer generated images appear to interact with the real-world view perceived by the user.

The sensor 1120 is shown on the extending side-arm 1114 of the head-mounted device 1100; however, the sensor 1120 may be positioned on other parts of the head-mounted device 1100. The sensor 1120 may include one or more of a gyroscope or an accelerometer, for example. Other sensing devices may be included within, or in addition to, the sensor 1120 or other sensing functions may be performed by the sensor 1120.

The finger-operable touch pad 1122 is shown on the extending side-arm 1112 of the head-mounted device 1100. However, the finger-operable touch pad 1122 may be positioned on other parts of the head-mounted device 1100. Also, more than one finger-operable touch pad may be present on the head-mounted device 1100. The finger-operable touch pad 1122 may be used by a user to input commands. The finger-operable touch pad 1122 may sense at least one of a position and a movement of a finger via capacitive sensing, resistance sensing, or a surface acoustic wave process, among other possibilities. The finger-operable touch pad 1122 may be capable of sensing finger movement in a direction parallel or planar to the pad surface, in a direction normal to the pad surface, or both, and may also be capable of sensing a level of pressure applied to the pad surface. The finger-operable touch pad 1122 may be formed of one or more translucent or transparent insulating layers and one or more translucent or transparent conducting layers. Edges of the finger-operable touch pad 1122 may be formed to have a raised, indented, or roughened surface, so as to provide tactile feedback to a user when the user's finger reaches the edge, or other area, of the finger-operable touch pad 1122. If more than one finger-operable touch pad is present, each finger-operable touch pad may be operated independently, and may provide a different function.

Figure 11B:
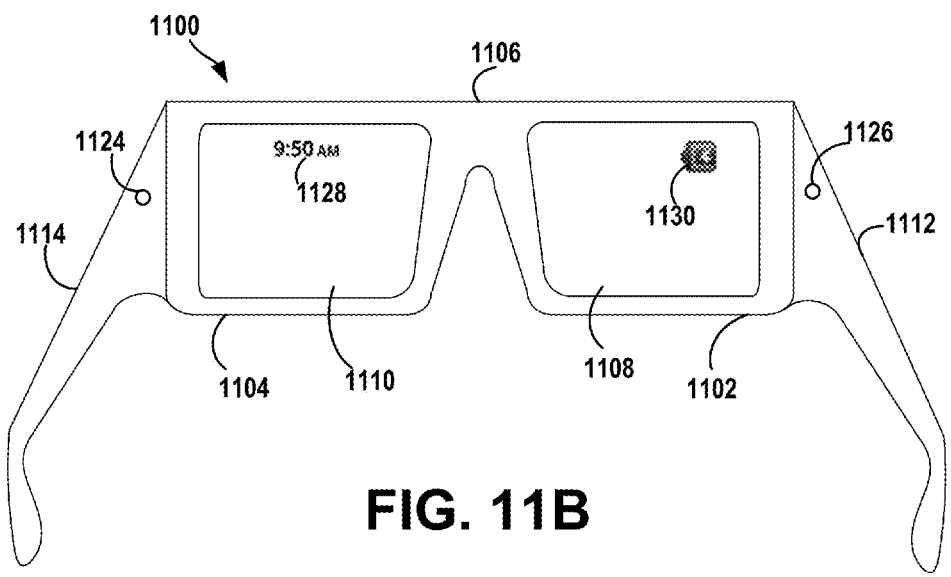

FIG. 11B illustrates an alternate view of the three-dimensional rendering of the example wearable computing device illustrated in FIG. 11A, in accordance with an embodiment. As shown in FIG. 11B, the lens elements 1108, 1110 may act as display elements. The head-mounted device 1100 may include a first projector 1124 coupled to an inside surface of the extending side-arm 1114 and configured to project a display 1128 onto an inside surface of the lens element 1110. Additionally or alternatively, a second projector 1126 may be coupled to an inside surface of the extending side-arm 1112 and configured to project a display 1130 onto an inside surface of the lens element 1108.

The lens elements 1108, 1110 may act as a combiner in a light projection system and may include a coating that reflects the light projected onto them from the projectors 1124, 1126. In some embodiments, a reflective coating may not be used (e.g., when the projectors 1124, 1126 are scanning laser devices).

In alternative embodiments, other types of display elements may also be used. For example, the lens elements 1108, 1110 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 1108, 1110 for driving such a matrix display. Alternatively or additionally, a laser or LED source and scanning system could be used to draw a raster display directly onto the retina of one or more of the user's eyes. Other possibilities exist as well.

Figure 11C:
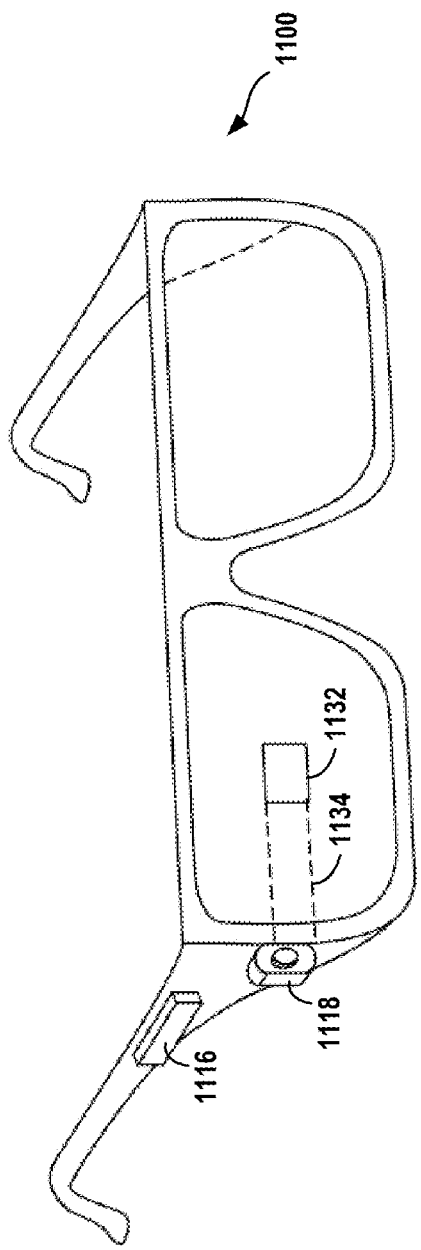

FIG. 11C illustrates a three-dimensional rendering of another wearable computing system, in accordance with an embodiment. As shown in FIG. 11C, the wearable computing device takes the form of a head-mounted device 1100. The head-mounted device 1100 may include frame elements and side-arms similar to those described above in connection with FIGS. 11A-B. The head-mounted device 1100 may additionally include an on-board computing system 1116 and a video camera 1118, which may take any of the forms described above in connection with FIGS. 11A-B. The video camera 1118 is shown mounted on a frame of the head-mounted device 1100. However, the video camera 1118 may be mounted at other positions as well.

As shown in FIG. 11C, the head-mounted device 1100 may include a single display 1132 which may be coupled to the head-mounted device 1100. The display 1132 may be formed on one of the lens elements of the head-mounted device 1100 and may be configured to overlay computer-generated graphics in the user's view of the physical world. For example, the display 1132 may be configured to overlay an object-model on an object in the physical world, as described above. The display 1132 is shown to be provided in a center of a lens of the head-mounted device 1100; however, the display 1132 may be provided in other positions as well. The display 1132 is controllable via the computing system 1116, which may be coupled to the display 1132 via an optical waveguide 1134, as shown.

Figure 11D:
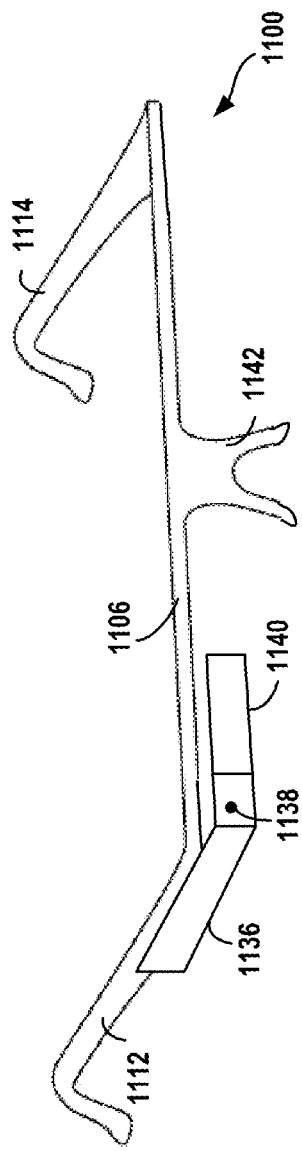

FIG. 11D illustrates a three-dimensional rendering of another wearable computing system, in accordance with an embodiment. As shown in FIG. 11D, the wearable computing device takes the form of a head-mounted device 1100. The head-mounted device 1100 may include side-arms 1112, 1114 and a center frame support 1106, which take any of the forms described above in connection with FIGS. 11A-B. Further, the head-mounted device 1100 may include a bridge portion with nosepiece 1142. The head-mounted device 1100 may additionally include an on-board computing system and a video camera (not shown), which may take any of the forms described above in connection with FIGS. 11A-B.

As shown in FIG. 11D, the center frame support 1106 connects the side-arms 1112, 1114. In contrast to those shown in FIGS. 11A-C, the head-mounted device 1100 shown in FIG. 11D does not include lens-frames containing lens elements. Rather, as shown, the head-mounted device 1100 may include a single lens element 1140 that may be coupled to one of the side-arms 1112 and/or the center frame support 1106. The single lens element 1140 may include a display and may be configured to overlay computer-generated graphics upon the user's view of the physical world. For example, the display 1132 may be configured to overlay an object-model on an object in the physical world, as described above. The display may be controllable via the computing system, which may be coupled to the display via an optical waveguide 1138, as shown.

In one example, the single lens element 1140 may be coupled to the inner side (i.e., the side exposed to a portion of a user's head when worn by the user) of the extending side-arm 1112. The single lens element 1140 may be positioned in front of or proximate to a user's eye when the head-mounted device 1100 is worn by a user. For example, the single lens element 1140 may be positioned below the center frame support 1106, as shown in FIG. 11D.

Figure 12:
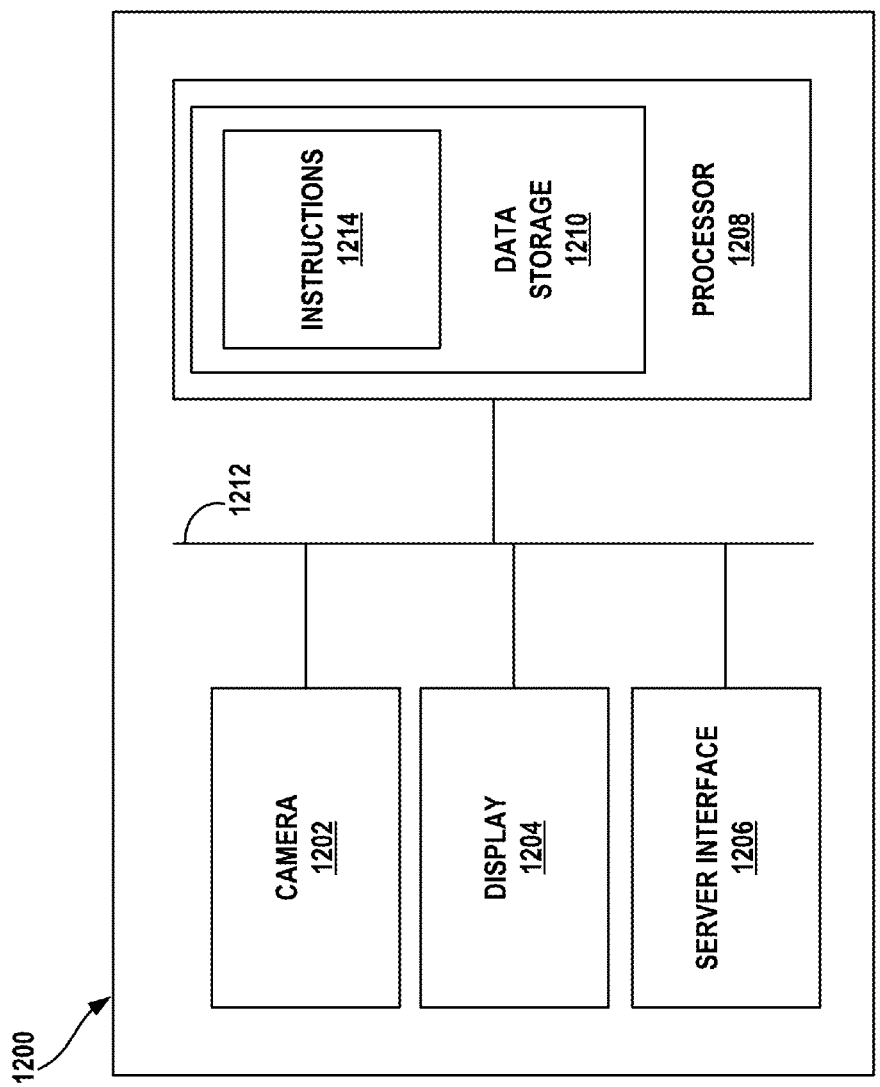
FIG. 12 is a simplified block diagram of an example wearable computing device, in accordance with an embodiment.

FIG. 12 is a simplified block diagram of an example wearable computing device 1200, in accordance with an embodiment. As shown, the wearable computing device 1200 includes a camera 1202, a display 1204, a server interface 1206, a processor 1208, and data storage 1210, all of which may be communicatively linked together by a system bus, network, and/or other connection mechanism 1212. The camera 1202 may be any camera configured to record video data. To this end, the camera 1202 may be configured to detect visible light, or may be configured to detect light from other portions of the spectrum, such as infrared or ultraviolet light, or x-rays. Other types of cameras are possible as well. The camera 1202 may be a two-dimensional detector, or may have a three-dimensional spatial range. In some embodiments, the camera 1202 may be, for example, a range detector configured to generate a two-dimensional image showing a distance from the camera 1202 to a number of points in the video data. To this end, the camera 1202 may use one or more range detecting techniques. For example, the camera 1202 may use a structured light technique in which the wearable computing device 1200 illuminates an object with a predetermined light pattern, such as a grid or checkerboard pattern and uses the camera 1202 to detect a reflection of the predetermined light pattern off the object. Based on distortions in the reflected light pattern, the wearable computing device 1200 may determine the distance to the points on the object. The predetermined light pattern may comprise infrared light, or light of another wavelength. As another example, the camera 1202 may use a laser scanning technique in which the wearable computing device 1200 emits a laser and scans across a number of points the object. While scanning the object, the wearable computing device 1200 uses the camera 1202 to detect a reflection of the laser off the object for each point. Based on a length of time it takes the laser to reflect off the object at each point, the wearable computing device 1200 may determine the distance to the points on the object. As yet another example, the camera 1202 may use a time-of-flight technique in which the wearable computing device 1200 emits a light pulse and uses the camera 1202 to detect a reflection of the light pulse off an object at a number of points on the object. In particular, the camera 1202 may include a number of pixels, and each pixel may detect the reflection of the light pulse from a point on the object. Based on a length of time it takes the light pulse to reflect off the object at each point, the wearable computing device 1200 may determine the distance to the points on the object. The light pulse may be a laser pulse. Other range detecting techniques are possible as well, including stereo triangulation, sheet-of-light triangulation, interferometry, and coded aperture techniques, among others. In some embodiments, the camera 1202 may be enhanced through sensor fusion technology. The camera 1202 may further take any of the forms described above in connection with FIG. 11A.

The display 1204 may be any display configured to overlay an object-model on an object in the real world, as described above. To this end, the display 1204 may be configured to display information received from the processor 1208. The display 1204 may additionally be configured to display information received from one or more additional sources. The display 1204 may be, for example, a heads-up display, a head-mounted display, an optical see-through display, an optical see-around display, a video see-through display, a flat-panel display, a light-emitting diode (LED) display, an electroluminescent display (ELD), a liquid crystal display (LCD), an organic LED (OLED) display, or any other type of display now known or later developed. The display 1204 may alternatively or additionally take any of the forms described above in connection with FIGS. 11A-D.

The server interface 1206 may be any interface configured to wirelessly communicate with a server. In particular, the server interface 1206 may be configured to transmit to the server one or more of the video data (or data derived from the video data) recorded by the camera 1202, a request for a search of an object-model database, and an updated request for an updated search of the object-model database. Further, the server interface 1206 may be configured to receive from the server one or more of object-models selected from the object-model database and additional information associated with the one or more object-models.

To this end, the server interface 1206 may include an antenna and a chipset for communicating with the server over an air interface. The chipset or server interface 1206 in general may be arranged to communicate according to one or more other types of wireless communication (e.g. protocols) such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. In some embodiments, the server interface 1206 may also be configured to wirelessly communicate with one or more other devices, such as an object-model database and/or other wearable computing devices.

The processor 1208 may comprise one or more general-purpose processors and/or one or more special-purpose processors. To the extent the processor 1208 includes more than one processor, such processors could work separately or in combination. Further, the processor 1208 may be integrated in whole or in part with the server interface 1204 and/or with other components.

Data storage 1210, in turn, may comprise one or more volatile and/or one or more non-volatile storage components, such as optical, magnetic, and/or organic storage, and data storage 1210 may be integrated in whole or in part with the processor 1208. In some embodiments, data storage 1210 may contain instructions 1214 (e.g., program logic) executable by the processor 1208 to execute various wearable computing device functions. For example, data storage 1210 may contain instructions 1214 executable by the processor 1208 to cause the camera 1202 to record video data of a movement corresponding to a selection of an object. Further, data storage 1210 may contain instructions 1214 executable by the processor 1208 to initiate a search on the object of an object-model database before the movement is complete. This approach may involve the wearable computing device 1200 searching the object-model database itself, or may involve the wearable computing device 1200 causing the server interface 1206 to transmit to the server a request for the server to search the object-model database. The request may include the video data (or data derived from the video data) recorded by the camera 1202. Data storage 1210 may further contain instructions 1214 executable by the processor 1208 to periodically update the search during the movement and cause the display 1204 to overlay the object with object-models from the object-model database corresponding to results of the search. To this end, the wearable computing device may itself update the search or may cause the server interface 1206 to transmit to the server an updated request for the server to update the search of the object-model database. Data storage 1210 may still further contain instructions to display additional information associated with one or more of the object-models. Data storage 1210 may contain additional instructions 1214 as well.

The wearable computing device 1200 may include one or more elements in addition to or instead of those shown. For example, the wearable computing device 1200 may include one or more additional interfaces and/or one or more power supplies. Other additional components are possible as well. In these embodiments, data storage 1210 may further include instructions executable by the processor(s) 1208 to control and/or communicate with the additional components.

c. Example Server

Figure 13:
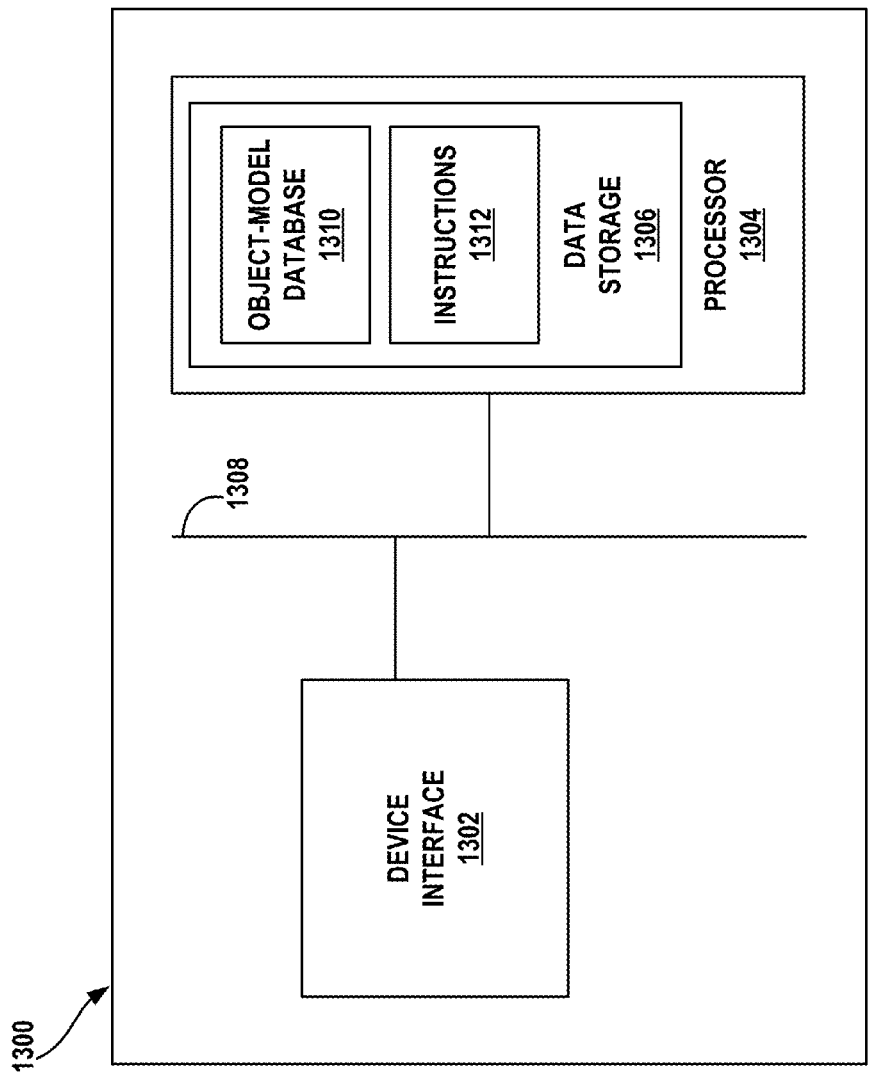
FIG. 13 is a simplified block diagram of an example server, in accordance with an embodiment.

FIG. 13 shows a block diagram of an example server 1300, in accordance with an embodiment. As shown, the server 1300 includes a device interface 1302, a processor 1304, and data storage 1306, all of which may be communicatively linked together by a system bus, network, and/or other connection mechanism 1308.

The device interface 1302 may be any interface configured to wirelessly communicate with a wearable computing device. In particular, the device interface 1302 may be configured to receive from the wearable computing device one or more of video data (or data derived from video data) recorded by a camera at the wearable computing device, a request for a search of an object-model database, and an updated request for an updated search of the object-model database. Further, the device interface 1302 may be configured to transmit to the wearable computing device one or more of object-models selected from the object-model database and additional information associated with the one or more object-models.

To this end, the device interface 1302 may include an antenna and a chipset for communicating with the wearable computing device over an air interface. The chipset or device interface 1302 in general may be arranged to communicate according to one or more other types of wireless communication (e.g. protocols) such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. In some embodiments, the device interface 1302 may also be configured to wirelessly communicate with one or more other devices, such as other wearable computing devices.

The processor 1304 may comprise one or more general-purpose processors and/or one or more special-purpose processors. To the extent the processor 1304 includes more than one processor, such processors could work separately or in combination. Further, the processor 1304 may be integrated in whole or in part with the device interface 1302 and/or with other components.

Data storage 1306, in turn, may comprise one or more volatile and/or one or more non-volatile storage components, such as optical, magnetic, and/or organic storage, and data storage 1306 may be integrated in whole or in part with the processor 1306. As shown, data storage 1306 includes an object-model database 1310. The object-model database 1310 may take any of the forms described above. In some embodiments, all or a portion of the object-model database 1310 may alternatively or additionally be included at the wearable computing device. Further, in some embodiments, all or a portion of the object-model database 1310 may alternatively or additionally be included at a remote entity that is configured to communicably couple to the wearable computing device and/or the server 1300.

Additionally, data storage 1306 may contain instructions 1312 (e.g., program logic) executable by the processor 1306 to execute various server functions. For example, data storage 1306 may include instructions 1312 executable by the processor 1306 to detect, based on the video data received from the wearable computing device via the device interface 1302, a movement corresponding to a selection of an object. In some embodiments, the server 1300 may itself detect the movement, while in other embodiments the wearable computing device may detect the movement and the video data may include an indication of the detected movement. The data storage 1306 may further include instructions 1312 executable by the processor 1306 to initiate a search on the object of the object-model database 1310 before the movement is complete. The data storage 1306 may still further include instructions 1312 executable by the processor 1306 to periodically update the search during the movement and cause the wearable computing device (e.g., by transmitting instructions to the wearable computing device via the device interface 1302) to overlay the object with object-models from the database corresponding to results of the search. The server 1300 may update the search itself, or may update the search in response to receiving additional video data from the wearable computing device. Data storage 1306 may include additional program logic as well.

The server 1300 may include one or more elements in addition to or instead of those shown. For example, the server 1300 may include one or more additional interfaces and/or one or more power supplies. Other additional components are possible as well. In these embodiments, data storage 1306 may further include instructions executable by the processor(s) 1304 to control and/or communicate with the additional components.

8. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
receiving video data recorded by a camera on a wearable computing device;
based on the video data, detecting a movement corresponding to a selection of an object;
before the movement is complete, initiating a search on the object of an object-model database; and
during the movement, periodically updating the search and causing the wearable computing device to overlay, on a display, the object with object-models from the database corresponding to results of the search.

2. The method of claim 1, wherein the object-models comprise at least one of two-dimensional images and three-dimensional models.

3. The method of claim 1, wherein at least one of the object-models comprises a representation of the object.

4. The method of claim 1, wherein the object-models are semi-transparent.

5. The method of claim 1, wherein overlaying the object with each object-model comprises aligning the object-model with the object.

6. The method of claim 5, wherein aligning the object-model with the object comprises at least one of scaling the object-model and rotating the object-model.

7. The method of claim 1, further comprising receiving an acceptance of one of the object-models.

8. The method of claim 7, further comprising causing the wearable computing device to display information associated with the accepted object-model.

9. The method of claim 1, wherein the movement comprises a movement corresponding to an outline of the object.

10. The method of claim 1, wherein the movement comprises a movement that occludes the object.

11. The method of claim 1, wherein the movement comprises one of a rotation of the object and a rotation around the object.

12. A method comprising:
   causing a camera on a wearable computing device to record video data of a movement corresponding to a selection of an object;
   before the movement is complete, initiating a search on the object of an object-model database; and
   during the movement, periodically updating the search and causing the wearable computing device to overlay, on a display, the object with object-models from the database corresponding to results of the search.

13. The method of claim 12, wherein initiating the search comprises transmitting to a server a request for the search, the request comprising at least a portion of the video data.

14. The method of claim 12, further comprising displaying the video data on the display.

15. The method of claim 12, further comprising:
   during the movement, causing the wearable computing device to display information associated with each of the object-models.

16. The method of claim 12, further comprising:
   receiving an acceptance of one of the object-models; and
   responsively causing the wearable computing device to display information associated with the accepted object-model.

17. The method of claim 12, further comprising:
   during the movement, caching information associated with each of the object-models;
   receiving an acceptance of one of the object-models; and
   responsively causing the wearable computing device to display the cached information associated with the accepted object-model.

18. A method comprising:
   a wearable computing device receiving a selection of an object;
   initiating a search on the object of an object-model database; and
   updating the search and causing the wearable computing device to overlay, on a display, the object with object-models from the database corresponding to results of the search.

* * * * *